(12) United States Patent
Waatti

(10) Patent No.: US 9,788,607 B2
(45) Date of Patent: Oct. 17, 2017

(54) ARTICLE OF FOOTWEAR INCORPORATING PRINTED PORTIONS

(71) Applicant: NIKE, Inc., Beaverton, OR (US)

(72) Inventor: Todd A. Waatti, Battle Ground, WA (US)

(73) Assignee: NIKE, Inc., Beaverton, OR (US)

( * ) Notice: Subject to any disclaimer, the term of this patent is extended or adjusted under 35 U.S.C. 154(b) by 27 days.

(21) Appl. No.: 14/932,299

(22) Filed: Nov. 4, 2015

(65) Prior Publication Data

US 2016/0242505 A1    Aug. 25, 2016

Related U.S. Application Data

(63) Continuation-in-part of application No. 14/627,231, filed on Feb. 20, 2015.

(51) Int. Cl.
| | | |
|---|---|---|
| A43B 23/00 | (2006.01) | |
| A43B 23/02 | (2006.01) | |
| A43B 3/24 | (2006.01) | |
| B33Y 80/00 | (2015.01) | |

(52) U.S. Cl.
CPC .......... *A43B 23/0215* (2013.01); *A43B 3/244* (2013.01); *A43B 23/0205* (2013.01); *B33Y 80/00* (2014.12)

(58) Field of Classification Search
CPC ........... A43B 3/24; A43B 3/244; A43B 3/122; A43B 1/10; A43B 1/12; A43B 1/14; A43B 23/0215; B29D 35/02; B29D 35/126; B29D 35/146; B29D 35/12
USPC .................................................. 36/100, 101
See application file for complete search history.

(56) References Cited

U.S. PATENT DOCUMENTS

| | | | |
|---|---|---|---|
| 2,368,314 A * | 1/1945 | Marx ....................... | A43B 3/24 36/101 |
| 3,538,628 A | 11/1970 | Einstein, Jr. | |
| 4,998,329 A * | 3/1991 | Boros .................. | A43B 1/0054 24/662 |
| 5,896,684 A * | 4/1999 | Lin ......................... | A43B 3/103 36/101 |
| 5,991,950 A | 11/1999 | Schenkel | |
| 6,311,413 B1 * | 11/2001 | Chern .................. | A43B 13/182 36/100 |
| 6,792,327 B1 | 9/2004 | Bamford | |
| 6,931,766 B2 | 8/2005 | Greene | |

(Continued)

FOREIGN PATENT DOCUMENTS

| | | |
|---|---|---|
| DE | 29808553 U1 | 8/1998 |
| DE | 20108377 U1 | 9/2002 |
| WO | 2016133592 A1 | 8/2016 |

OTHER PUBLICATIONS

Invitation to Pay Additional Fees dated Apr. 29, 2016 for PCT Application No. PCT/US2015/067910.

(Continued)

*Primary Examiner* — Ted Kavanaugh
(74) *Attorney, Agent, or Firm* — Quinn IP Law

(57) ABSTRACT

An article of footwear includes an upper and a sole structure. The upper includes elongated members extending from a lower peripheral portion that mechanically connect the upper to a sole structure. The sole structure includes several recesses for engaging the elongated members. The upper and/or the elongated members can be printed using a three-dimensional printer.

20 Claims, 24 Drawing Sheets

(56) References Cited

U.S. PATENT DOCUMENTS

| | | |
|---|---|---|
| 8,005,558 B2 | 8/2011 | Waatti et al. |
| 8,307,570 B2 | 11/2012 | Delgatty |
| 8,613,716 B2 | 12/2013 | Summit et al. |
| 2010/0018079 A1* | 1/2010 | Albert .................... A43B 3/122 36/101 |
| 2011/0214311 A1* | 9/2011 | Stonisch ................. A43B 3/12 36/101 |
| 2012/0117822 A1 | 5/2012 | Jarvis |
| 2012/0304449 A1 | 12/2012 | Jackson et al. |
| 2012/0308332 A1 | 12/2012 | Jackson |
| 2013/0019496 A1 | 1/2013 | Mizrahi-Shapiro |
| 2013/0055590 A1* | 3/2013 | Mokos .................... A43B 1/04 36/45 |
| 2013/0073068 A1 | 3/2013 | Napadensky |
| 2013/0152427 A1 | 6/2013 | Gillett |
| 2013/0171019 A1 | 7/2013 | Gessler et al. |
| 2013/0212908 A1 | 8/2013 | Hsu |
| 2013/0295338 A1 | 11/2013 | Keating et al. |
| 2014/0020191 A1* | 1/2014 | Jones ................... A43B 3/0084 12/142 R |

OTHER PUBLICATIONS

International Search Report and Written Opinion dated Jul. 4, 2016 for PCT Application No. PCT/US2015/067910.

\* cited by examiner

ARTICLE OF FOOTWEAR INCORPORATING PRINTED PORTIONS

CROSS-REFERENCE TO RELATED APPLICATIONS

This application is a continuation-in-part of Waatti, U.S. patent application Ser. No. 14/627,231, filed Feb. 20, 2015, entitled "Article of Footwear Having an Upper with Connectors for Attaching to a Sole Structure," the disclosure of which is entirely incorporated herein by reference.

BACKGROUND

The present embodiments relate generally to articles of footwear, and in particular to articles of footwear with an upper and sole structure.

Articles of footwear generally include an upper and a sole structure. The upper may be formed from a variety of materials that are stitched (sewn) or adhesively bonded together to form a space or void within the footwear in order to support and secure a foot. The sole assembly is secured to a lower portion of the upper and is generally positioned between the foot and the ground. In many articles of footwear, including athletic footwear styles, the sole assembly often incorporates an insole, a midsole, and an outsole.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Embodiments can include provisions for connecting an upper and a sole structure. In one aspect, an article of footwear includes an upper having a lower peripheral portion, where the upper includes an elongated member extending from the lower peripheral portion. The article of footwear also includes a sole structure having a top surface and an opposing bottom surface, where the top surface is disposed closer to the upper than is the bottom surface. The sole structure includes a recess disposed in the top surface. The top surface of the sole structure further includes an interior portion, and also includes an outer peripheral portion disposed outwardly of the interior portion. The recess includes a first end portion associated with the outer peripheral portion of the top surface, and the recess includes a second end portion associated with the interior portion of the top surface. The elongated member includes a first end portion, and the elongated member includes a second end portion. The first end portion of the elongated member engages the first end portion of the recess, and the second end portion of the elongated member engages the second end portion of the recess.

In another aspect, a method of making an article of footwear includes associating an upper of the article of footwear with a printer, where the upper has a lower peripheral portion. The method also includes printing a first end portion of a mechanical connector so that the first end portion of the mechanical connector is coupled with the lower peripheral portion. The method also includes printing a second end portion of the mechanical connector, where the second end portion extends away from the lower peripheral portion. The second end portion is configured to engage a sole structure and fasten the upper to the sole structure.

In another aspect, a method of printing an upper and an elongated member with a printer includes providing the printer capable of printing each of a first polymeric material and a second polymeric material, where the first polymeric material has a density when cured that is less than a density of the second polymeric material when cured. The method also includes printing the upper with the first polymeric material and printing the elongated member with the second polymeric material. The elongated member is configured to mechanically connect the upper to a sole structure.

Other systems, methods, features, and advantages of the embodiments will be, or will become, apparent to one of ordinary skill in the art upon examination of the following figures and detailed description. It is intended that all such additional systems, methods, features, and advantages be included within this description and this summary, be within the scope of the embodiments, and be protected by the following claims.

Figure 1:
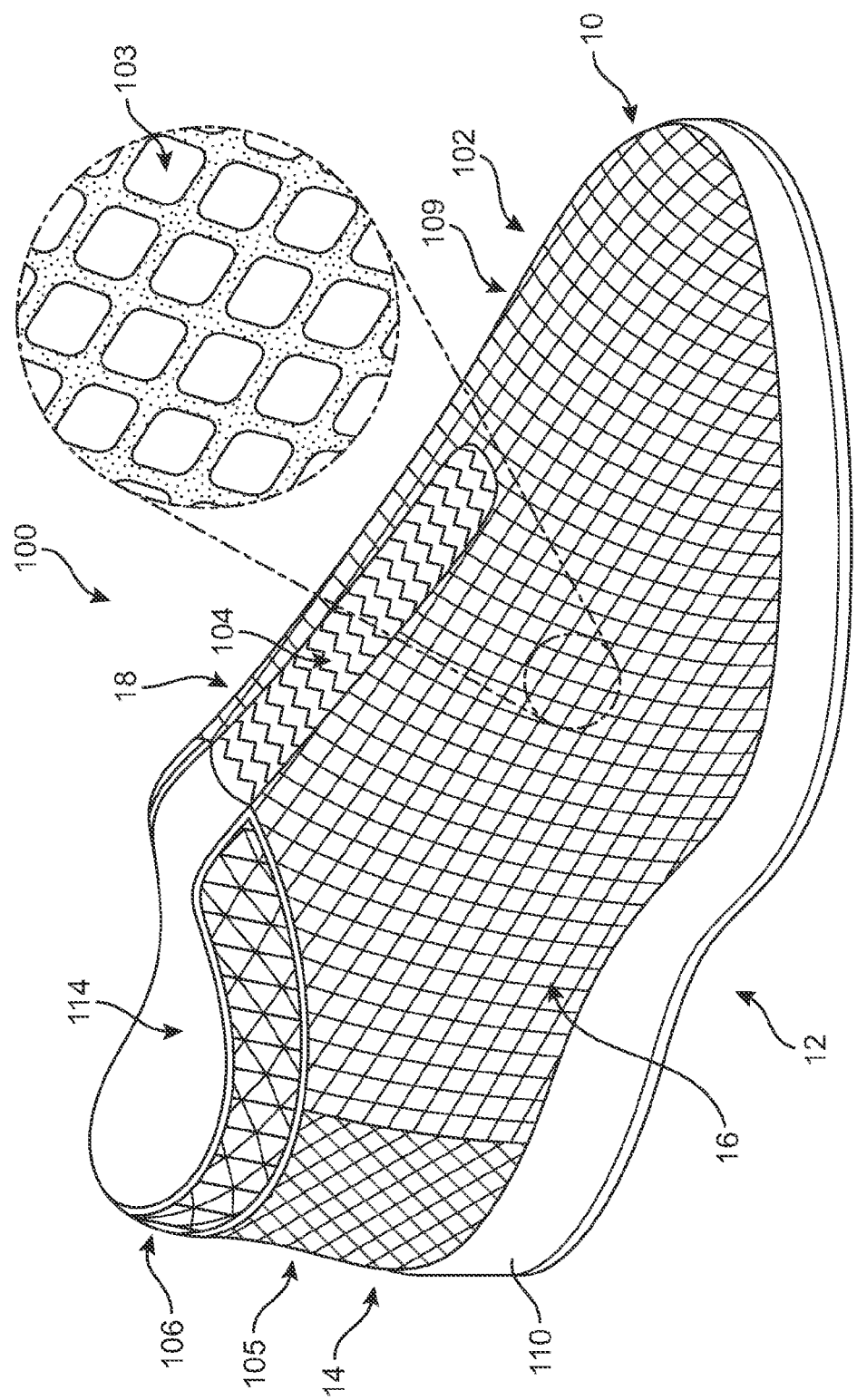
FIG. 1 is an isometric side view of an embodiment of an article of footwear with an upper having various portions.

FIG. 1 illustrates an isometric view of an embodiment of an article of footwear 100, or simply article 100. Although the embodiments throughout this detailed description depict articles configured as athletic articles of footwear, in other embodiments the articles may be configured as various other kinds of footwear including, but not limited to, hiking boots, soccer shoes, football shoes, sneakers, running shoes, cross-training shoes, rugby shoes, basketball shoes, baseball shoes as well as other kinds of shoes. Moreover, in some embodiments, articles may be configured as various kinds of non-sports-related footwear, including, but not limited to, slippers, sandals, high-heeled footwear, loafers as well as any other kinds of footwear.

Articles are generally made to fit various sizes of feet. In the embodiments shown, the various articles are configured with the same footwear size. In different embodiments, the articles could be configured with any footwear sizes, including any conventional sizes for footwear known in the art. In some embodiments, an article of footwear may be designed to fit the feet of a child. In other embodiments, an article of footwear may be designed to fit the feet of an adult. Still, in other embodiments, an article of footwear may be designed to fit the feet of a man or a woman.

In some embodiments, an article of footwear may include an upper and a sole structure. In the embodiment shown in FIG. 1, article 100 has upper 102 attached to sole structure 110. Sole structure 110 is secured or fastened to an upper and extends between the foot and the ground when an article is worn. In different embodiments, sole structure 110 may include different components. For example, sole structure 110 may include an outsole, a midsole, and/or an insole. In some cases, one or more of these components may be optional.

Sole structure 110 may provide one or more functions for an article. For example, in some embodiments, sole structure 110 may be configured to provide traction for an article. In addition to providing traction, sole structure 110 may attenuate ground reaction forces when compressed between the foot and the ground during walking, running, or other ambulatory activities. The configuration of sole structure 110 may vary significantly in different embodiments to include a variety of conventional or non-conventional structures. In some cases, the configuration of sole structure 110 can be selected according to one or more types of ground surfaces on which sole structure 110 may be used. Examples of ground surfaces include, but are not limited to, natural turf, synthetic turf, dirt, pavement, as well as other surfaces.

Generally, upper 102 may be any type of upper. In particular, upper 102 may have any design, shape, size, and/or color. For example, in embodiments where article 100 is a basketball shoe, upper 102 could be a high-top upper that is shaped to provide high support on an ankle. In embodiments where article 100 is a running shoe, upper 102 could be a low-top upper. In some embodiments, upper 102 could further include provisions for fastening article 100 to a foot, such as a hook and look system (Velcro, for example) and may include still other provisions found in footwear uppers. Also, some embodiments of upper 102 may include leather, synthetic materials (such as plastic or synthetic leather), mesh, or a combination thereon. In FIG. 1, upper 102 is made from a printable material dispersed by a three-dimensional printer according to a method discussed in further detail below.

Referring to FIG. 1, for purposes of reference, upper 102 may be divided into forefoot portion 10, midfoot portion 12, and heel portion 14. Forefoot portion 10 may be generally associated with the toes and joints connecting the metatarsals with the phalanges. Midfoot portion 12 may be generally associated with the metatarsals of a foot. Likewise, heel portion 14 may be generally associated with the heel of a foot, including the calcaneus bone. In addition, upper 102 may include lateral side 16 and medial side 18. In particular, lateral side 16 and medial side 18 may be opposing sides of article 100. Furthermore, both lateral side 16 and medial side 18 may extend through forefoot portion 10, midfoot portion 12, and heel portion 14. It will be understood that forefoot portion 10, midfoot portion 12, and heel portion 14 are only intended for purposes of description and are not intended to demarcate precise regions of upper 102. Likewise, lateral side 16 and medial side 18 (not shown) are intended to represent generally two sides of upper 102, rather than precisely demarcating upper 102 into two halves. As shown in FIG. 1, article of footwear 100 is intended to be used with a right foot; however, it should be understood that the following description may equally apply to a mirror image of article of footwear 100 that is intended for use with a left foot (not shown).

For consistency and convenience, directional adjectives are employed throughout this detailed description corresponding to the illustrated embodiments. The term "lateral" as used to indicate a direction throughout this detailed description and in the claims refers to a direction extending along a width of a component. For example, the lateral direction of upper 102 may extend between medial side 18 and lateral side 16 of upper 102. Additionally, the term "distal" as used throughout this detailed description and in the claims refers to a direction directed away from a foot, while the term "proximal" as used throughout this detailed description and in the claims refers to a direction directed toward the foot. It will be understood that each of these directional adjectives may be applied to individual components of an article, such as an upper and/or a sole structure.

In some embodiments, upper 102 as shown in FIG. 1 may be made from a three-dimensional printer (discussed in detail later). The term "three-dimensional printer" as used throughout this detailed description and in the claims refers to a printing apparatus capable of printing or disposing a printable material that forms a three-dimensional object. The printable material could be associated with any color such as red, blue, green, yellow, white, black, or a combination thereof. The printable material could also be made of toner material made from acrylic, plastic, ink, or any other polymeric material known in the art for printing a three-dimensional object from a three-dimensional printer.

In different embodiments, upper 102 may be configured with one or more designs in order to achieve a certain look or function. For example, in the embodiment shown in FIG. 1, upper 102 comprises mesh structure 103 disposed throughout one or more portions of upper 102.

In at least some embodiments, mesh structure 103 provided for upper 102 can vary throughout different portions of upper 102. For example, the embodiment shown in FIG. 1 is configured with several distinct portions, which may each be characterized by a different mesh configuration. First portion 109 of upper 102 may extend primarily through forefoot portion 10 and midfoot portion 12. Second portion 105 of upper 102 may primarily extend through heel portion 14. Third portion 106 of upper 102 may primarily extend around opening 114 of upper 102, where opening 114 is configured to receive a foot. As indicated schematically in FIG. 1, each of these portions may have distinct mesh patterns that may vary in mesh size, mesh geometry, and/or material properties. As one example, an enlarged view of first portion 109 of upper 102 shows that mesh structure 103 comprises a grid of material surrounding diamond-shaped and/or rectangular openings. It will be understood that the mesh patterns for each distinct portion of upper 102 can be varied to achieve different provisions in different portions of upper 102. Moreover, while the exemplary embodiment depicts a particular arrangement of distinct mesh patterns for different portions of upper 102, other embodiments could include any other configurations of mesh patterns. In at least some embodiments, for example, a majority of upper 102 may be comprised of a single mesh pattern. In still other embodiments, some portions of upper 102 could be comprised of any other non-mesh materials including various textiles, leather goods, or other materials known in the art for making uppers.

Upper 102 may further include tongue portion 104. In some embodiments, tongue portion 104 may be disposed along the throat of upper 102. In at least some embodiments, tongue portion 104 may comprise a portion that is substantially more flexible than adjacent portions of upper 102, which may be comprised of mesh structure 103. It is contemplated that in at least some embodiments, tongue portion 104 may facilitate the expansion of the throat of upper 102 around a foot. In some embodiments, tongue portion 104 may provide tension between opposing sides of upper 102 once a foot has been inserted into upper 102, thereby helping to keep upper 102 fastened around the foot. Tongue portion 104 may also provide cushioning to the top of a foot.

Tongue portion 104 could be made of any material. In some embodiments, for example, tongue portion 104 could be comprised of a stretchable fabric. In other embodiments, tongue portion 104 could have a mesh configuration.

Figure 2:
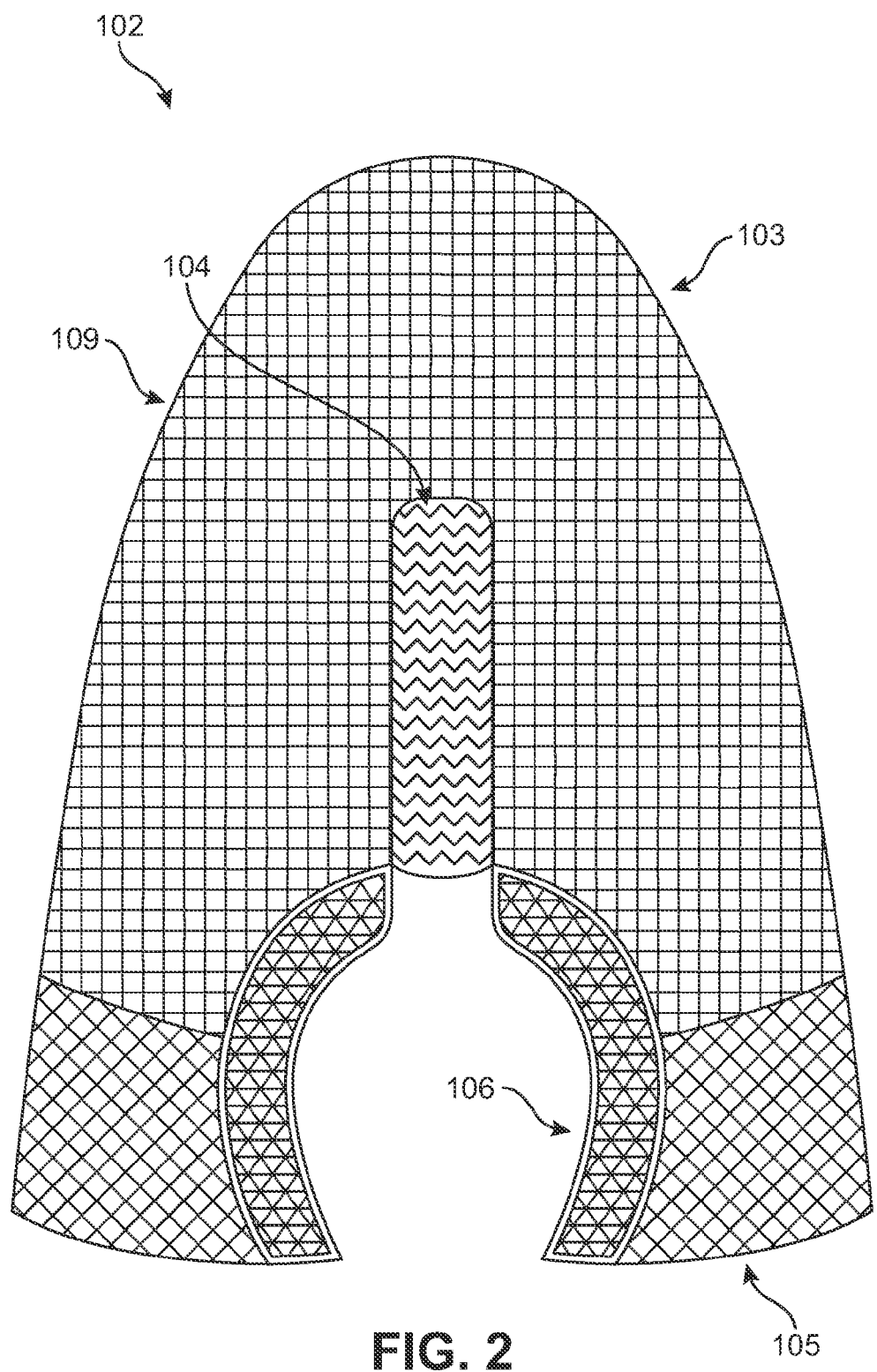
FIG. 2 is a schematic view of the upper shown in FIG. 1.

FIG. 2 illustrates a schematic view of upper 102 in a flattened configuration. In embodiments where upper 102 is formed using a three-dimensional printer, the three-dimensional printer may print, for example, first portion 109, second portion 105, and third portion 106 of upper 102. In some cases, the three-dimensional printer could also be used to print tongue portion 104. However, some portions may be printed and others may be joined to the printed portions at a later time. For example, in some embodiments, tongue portion 104 could be joined with upper 102 after first portion 109, second portion 105, and third portion 106 have been printed.

Figure 3:
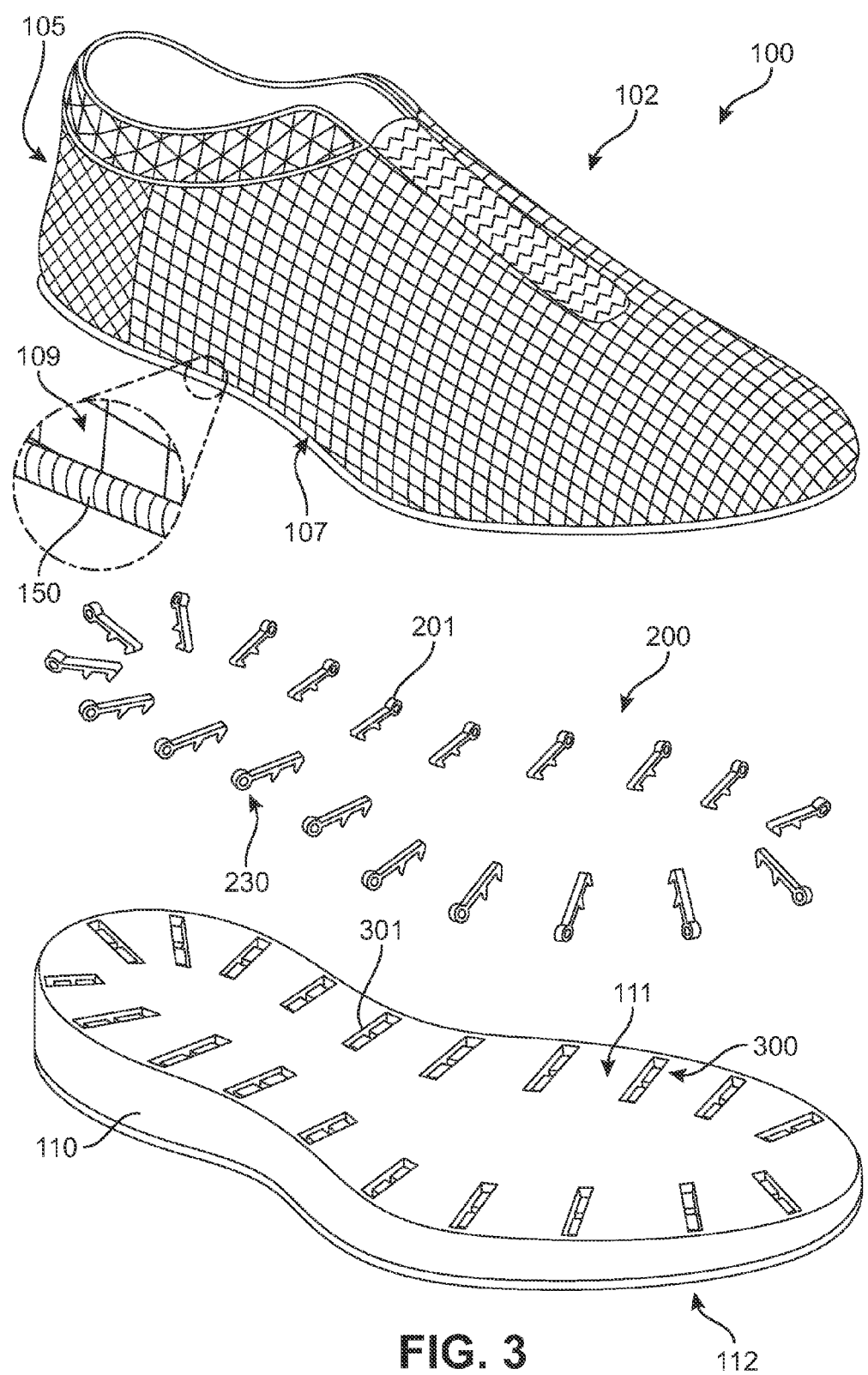
FIG. 3 is an exploded view of the embodiment of the article of footwear in FIG. 1 showing the upper, elongated members, and the sole structure.

Upper 102 may then be formed into a three-dimensional structure, as shown in FIGS. 1 and 3; for example, in order to conform to a traditional upper that is shaped to receive a foot. In other embodiments, upper 102 may be printed as a three-dimensional structure such that immediately after upper 102 is formed, upper 102 is configured to receive a foot. In other words, in at least some embodiments, upper 102 could be printed with a three-dimensional geometry, rather than being printed as a two-dimensional layer.

Embodiments can include provisions to attach an upper to a sole structure without the use of adhesives, stitching, sewing, knitting, or use of a strobel. In the embodiments shown in FIG. 3, upper 102 may attach to sole structure 110 by using plurality of elongated members 200 (also referred to hereafter as simply elongated members 200). In at least some embodiments, elongated members 200 may be mechanical connectors that facilitate the connection of an upper to a sole structure.

FIG. 3 is an exploded view of the embodiment of upper 102 shown in FIG. 1, along with elongated members 200 and sole structure 110. Sole structure 110 includes top surface 111 having plurality of recesses 300 (also referred to hereafter as simply recesses 300). Sole structure 110 further includes bottom surface 112, which is a surface opposite of top surface 111. Top surface 111 is disposed closer to upper 102 than bottom surface 112. Bottom surface 112 is generally intended to contact a ground surface (not shown). Recesses 300 on top surface 111 are generally configured to receive elongated members 200. For example, first elongated member 201 may be received by first recess 301.

In the embodiment shown in FIG. 3, upper 102 further includes cord element 150. Cord element 150 generally extends along lower peripheral portion 107 of upper 102. The term "lower peripheral portion" as used throughout this detailed description and in the claims refers to the outer perimeter of upper 102 when upper 102 is laid flat, and refers to the lower perimeter of upper 102 adjacent to sole structure 110 when upper 102 is attached to sole structure 110. Cord element 150 generally has a circular cross section with the diameter of the circular cross section being less than the diameter of apertures 230 of elongated members 200. In other embodiments, cord element 150 could have a square or rectangular cross section, and accordingly, other embodiments of apertures 230 of elongated members 200 could be square or rectangular, respectively.

Elongated members 200 may attach to upper 102 by cord element 150 passing through apertures 230 of elongated members 200. While cord element 150 is used to attach elongated members 200 to upper 102 in the exemplary embodiment, in other embodiments, elongated members 200 may be attached directly onto lower peripheral portion 107 of upper 102. For example, elongated members 200 could be attached directly to first portion 109 and/or second portion 105 of upper 102 at lower peripheral portion 107. Further, in other embodiments, elongated members 200 could be connected to upper 102 at one or more portions above lower peripheral portion 107.

Also, as shown in FIG. 3, elongated members 200 are generally spaced evenly around lower peripheral portion 107 of upper 102. That is, elongated members 200 may be disposed on forefoot portion 10, midfoot portion 12, and heel portion 14 on both lateral side 16 and the medial side (not shown) of article 100. In other embodiments, elongated members 200 may not be evenly spaced around lower peripheral portion 107 of upper 102. For example, elongated members 200 on forefoot portion 10 could be spaced further apart from one another than elongated members 200 on midfoot portion 12.

Figure 4:
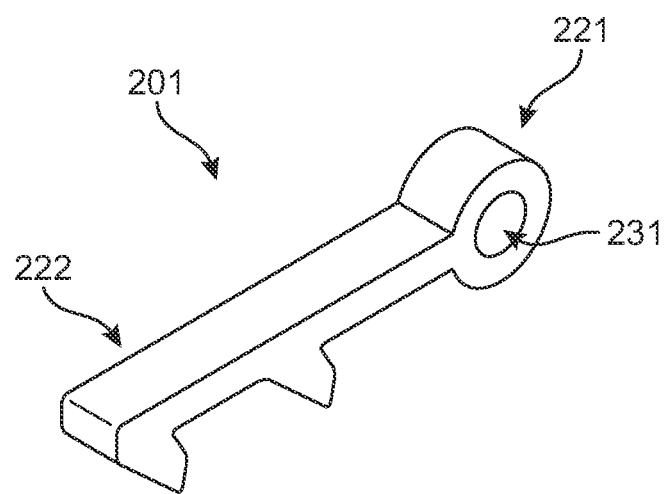
FIGS. 4 and 5 are enlarged views of an embodiment of an elongated member.
Figure 5:
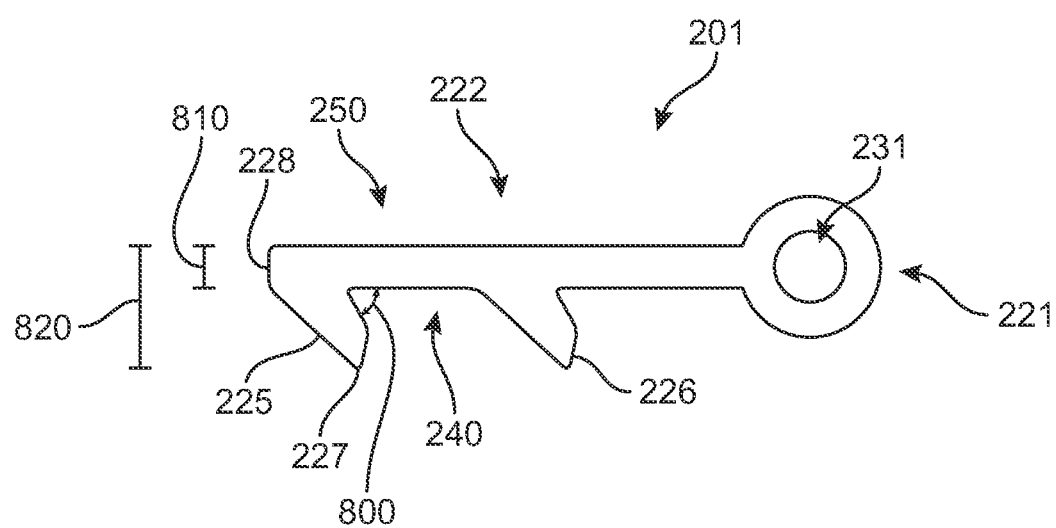
Figure 6:
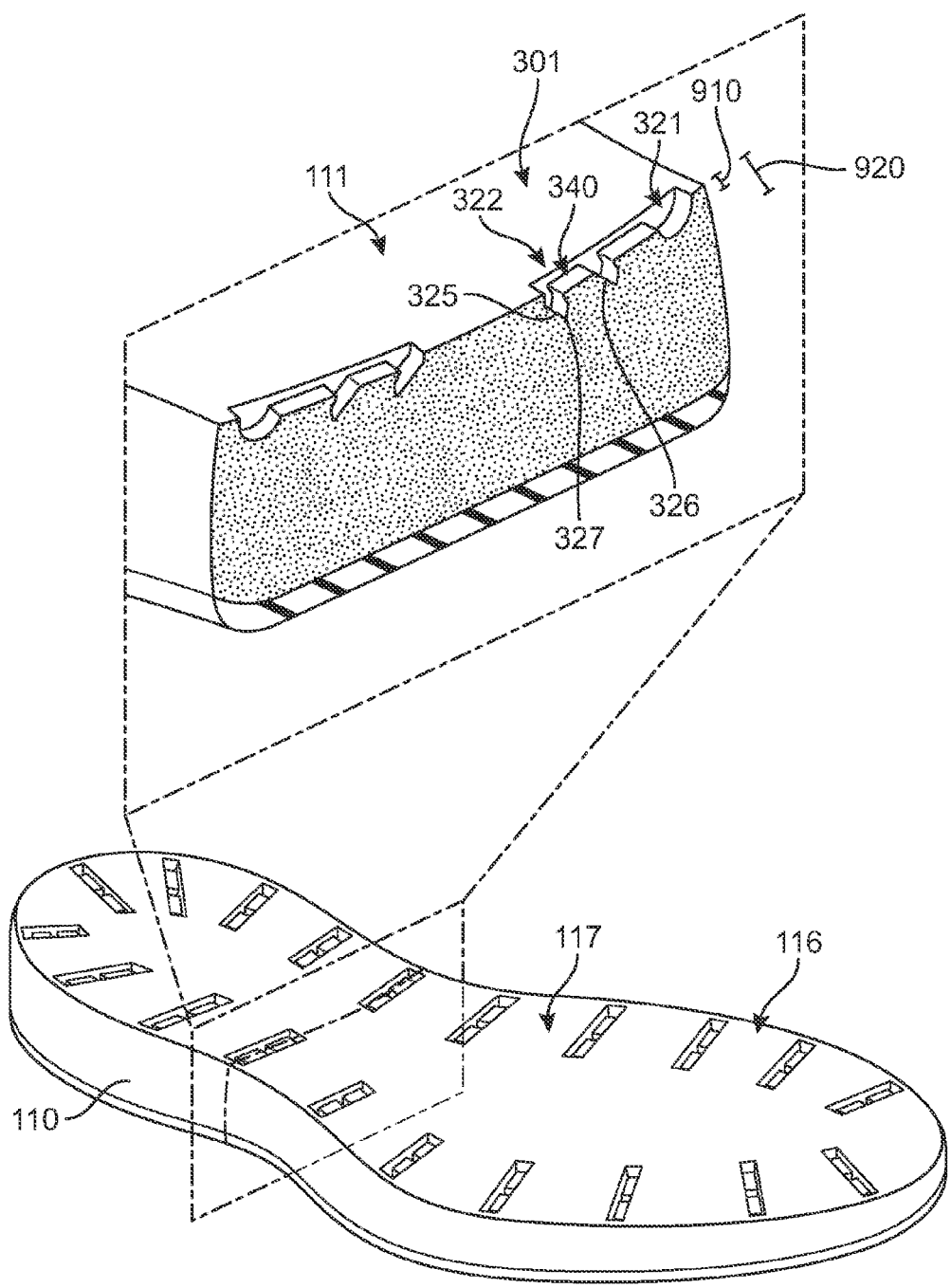
FIG. 6 is an isometric view of the embodiment of the sole structure in FIG. 3, further including a cross-sectional view of the sole structure.

FIGS. 4-6 illustrate the relationship between elongated members 200 attached to upper 102 and recesses 300 on sole structure 110. Elongated members 200 include first elongated member 201. Referring to FIGS. 4 and 5, first elongated member 201 includes first end portion 221 and second end portion 222. First end portion 221 includes first aperture 231. In some embodiments, first end portion 221 has a rounded or ring-like geometry that surrounds first aperture 231. In other embodiments, however, the geometry of first end portion 221 could vary in any other manner.

First aperture 231 may be configured to receive cord element 150 of upper 102. By cord element 150 extending through first aperture 231 of first end portion 221, first elongated member 201 is free to at least partially rotate around cord element 150. This allows for easier alignment between first elongated member 201 and first recess 301 (see FIG. 6).

In some embodiments, the exterior appearance of first end portion 221 may correspond to the shape of first aperture 231. For example in FIG. 4, first aperture 231 is generally round, and accordingly, first end portion 221 is also generally round. In other embodiments, first aperture 231 could be square or rectangular, and accordingly, first end portion 221 of first elongated member 201 and first end portion 321 of first recess 301 could also be square or rectangular, respectively. In other embodiments, the geometry of first aperture 231 may not correspond with the geometry of first end portion 221.

As shown in FIG. 5, first elongated member 201 further includes second end portion 222. In order to engage first recess 301 (shown in FIG. 6) of recesses 300 and secure upper 102 to sole structure 110, second end portion 222 may include several protrusions on bottom surface 240 of second end portion 222. In some embodiments, second end portion 222 could include one protrusion. In other embodiments, second end portion 222 could include at least three, four, or five protrusions.

In the exemplary embodiment shown in FIG. 5, second end portion 222 includes first protrusion 225 and second protrusion 226. First protrusion 225 and second protrusion 226 generally extend in a distal direction with respect to bottom surface 240. In other words, first protrusion 225 and second protrusion 226 extend away from bottom surface 240. Although the embodiment shown in FIG. 5 illustrates first protrusion 225 and second protrusion 226 as generally similar, first protrusion 225 and second protrusion 226 may have at least some differences in other embodiments. Also, as shown in FIG. 5, in the exemplary embodiment, first protrusion 225 and second protrusion 226 have a pointed end. For example, first protrusion has first end 227. In other embodiments, first end 227 could be a flat surface. Still, in other embodiments, first end 227 could be a rounded surface.

To better secure or fasten upper 102 to sole structure 110, protrusions of an elongated member may be oriented such that an angle between the protrusions and bottom surface 240 of second end portion 222 is less than 90 degrees. For example in FIG. 5, angle 800 between first protrusion 225 and bottom surface 240 is approximately 45 degrees. In other embodiments, angle 800 between first protrusion 225 and bottom surface 240 may vary in the range of approximately 10 degrees and 80 degrees. Also, in FIG. 5, the angle between second protrusion 226 and bottom surface 240 is generally similar to the angle between first protrusion 225 and bottom surface 240, and may vary according to the same range as described for first protrusion 225. However, in other embodiments, the angle between first protrusion 225 and bottom surface 240 may differ from the angle between second protrusion 226 and bottom surface 240.

Referring to FIGS. 5 and 6, second end portion 222 may have a top surface 250. Top surface 250 is generally a surface disposed on the opposite side of bottom surface 240. Second end portion 222 has first thickness 810 extending between top surface 250 and bottom surface 240. Second end portion 222 further has second thickness 820 extending between top surface 250 and first end 227 of first protrusion 225. First thickness 810 and second thickness 820 may correspond with depths of a recess configured to receive them, as discussed below. Also, FIG. 5 further shows second end portion 222 having tip 228. Tip 228 as shown in FIG. 5 is generally flat. However, in other embodiments, tip 228 could be rounded or pointed.

FIG. 6 shows the embodiment of the sole structure 110 shown in FIG. 3, with a cross-sectional view of sole structure 110 showing first recess 301. As shown in the cross section, first recess 301 includes first end portion 321 and second end portion 322. First end portion 321 is generally located on outer peripheral portion 116 of top surface 111 of sole structure 110. The term "outer peripheral portion" as used throughout this detailed description and in the claims refers to an area near the outer perimeter of top surface 111 of sole structure 110. It will be understood that outer peripheral portion 116 is only intended for purposes of description and is not intended to demarcate a precise location. Generally, first end portion 321 of first recess 301 has a shape corresponding to first end portion 221 of first elongated member 201. For example, first end portion 321 of first recess 301 is generally round, which corresponds to a rounded shape of first end portion 221 of first elongated member 201, as shown in FIGS. 4 and 5. First end portion 321 of first recess 301 is generally configured to receive at least some portion of first end portion 221 of first elongated member 201.

FIG. 6 further shows second end portion 322 of first recess 301. Second end portion 322 of first recess 301 is generally located on interior portion 117 of top surface 111 of sole structure 110. The term "interior portion" as used throughout this detailed description and in the claims refers to the central area of top surface 111 of sole structure 110, or an area disposed inwardly of outer peripheral portion 116. Generally, second end portion 322 of first recess 301 has a shape corresponding to second end portion 222 of first elongated member 201. For example, as shown in FIG. 6, second end portion 322 of first recess 301 includes first notch 325 and second notch 326. In some embodiments, first notch 325 and second notch 326 generally have a shape corresponding to first protrusion 225 and second protrusion 226 of first elongated member 221, respectively.

Second end portion 322 also includes bottom surface 340. Bottom surface 340 extends between first notch 325 and second notch 326, and also extends between second notch 326 and first end portion 321. The angle (not shown) between first notch 325 of first recess 301 and bottom surface 340 of first recess 301 is configured to be similar to angle 800 between first protrusion 225 and bottom surface 240 of first elongated member 201. Further, the angle (not shown) between second notch 326 of first recess 301 and bottom surface 340 of first recess 301 is generally similar to the angle between second protrusion 226 and bottom surface 340 of first elongated member 201. First notch 325 and second notch 326 are configured to receive first protrusion 225 and second protrusion 226, respectively.

As seen in FIG. 6, second end portion 322 has first depth 910 extending from bottom surface 340 of second end portion 322 to top surface 111 of sole structure 110, and second depth 920 extending from first end 327 of first notch 325 to top surface 111 of sole structure 110. Generally, first depth 910 of first recess 301 and second depth 920 of first recess 301 are substantially similar to first thickness 810 of second end portion 222 and second thickness 820 of second end portion 222 (see FIG. 5), respectively. Accordingly, when first elongated member 201 is disposed in first recess 301, second end portion 222 of first elongated member 201 is disposed within second end portion 322 of first recess 301 such that top surface 250 of first elongated member 201 is substantially co-planar, or flush, with top surface 111 of sole structure 110. The term "co-planar" as used in this detailed description and in the claims refers to two or more surfaces disposed on the same two-dimensional plane. In other embodiments, top surface 250 of first elongated member 201 may not be co-planar with respect to top surface 111 of sole structure 110. For example, first thickness 810 could be greater than first depth 910 so that top surface 250 of first elongated member 201 is elevated with respect to top surface 111 of sole structure 110. Alternatively, first depth 910 could be greater than first thickness 810 so that top surface 111 of sole structure 110 is elevated with respect to top surface 250 of first elongated member 201.

Figure 7:
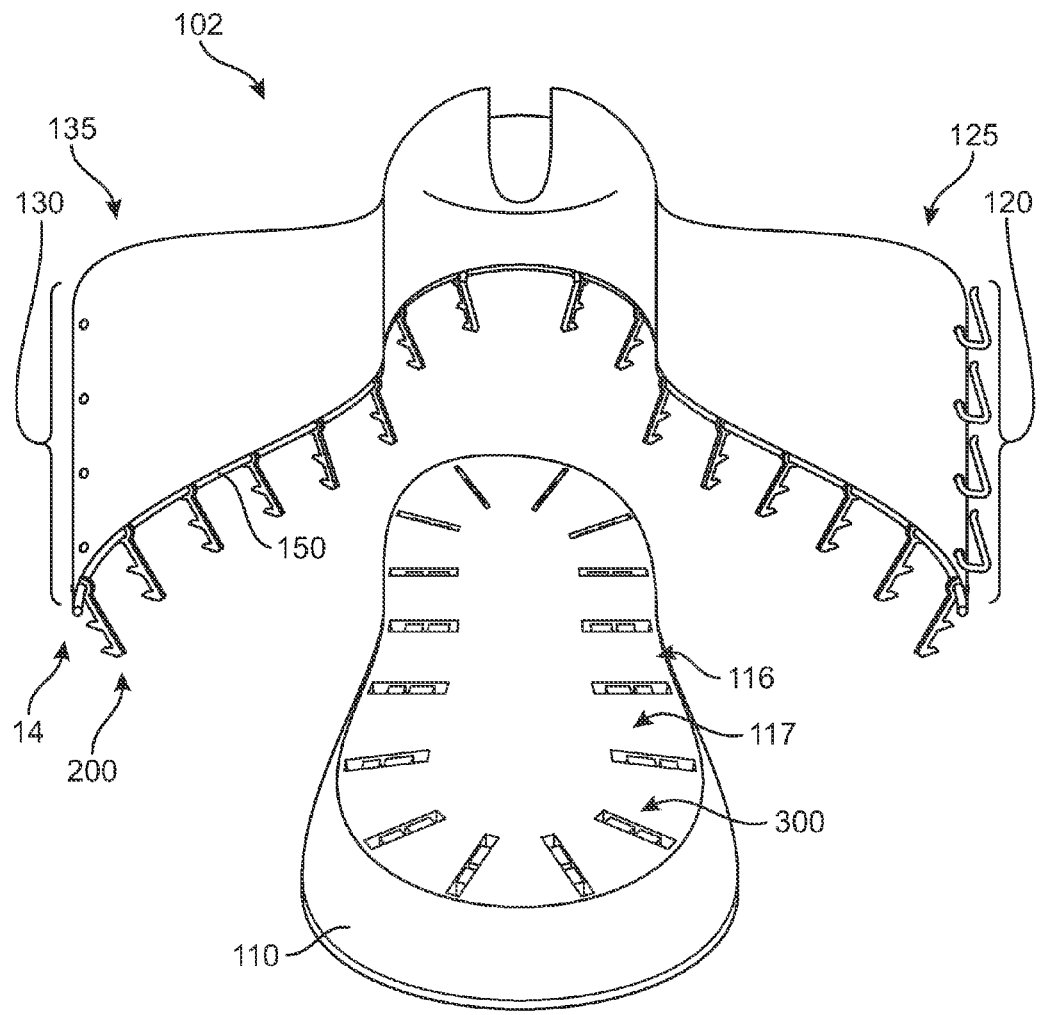
FIGS. 7-10 are schematic views of steps in a method of connecting an upper to a sole structure, according to an embodiment.

FIGS. 7-10 illustrate the assembly or connection of upper 102 to sole structure 110 using elongated members 200. For purposes of illustration, some details of upper 102 in FIGS. 7-10 have been omitted. FIG. 7 shows upper 102 having elongated members 200 attached to upper 102.

In the exemplary embodiment shown in FIG. 7, upper 102 includes heel straps 120 on first end 125 of heel portion 14, and apertures 130 on second end 135 of heel portion 14. Heel straps 120 are generally elongated pieces of material that may be used to fasten heel portion 14. In at least some embodiments, heel straps 120 may be formed by a three-dimensional printing process from a printable material, e.g., a polymeric material. In order to enclose heel portion 14, heel straps 120 engage apertures 130. In other embodiments, heel straps 120 may be disposed on second end 135 of heel portion 14, and apertures 130 may be disposed on first end 125 of heel portion 14.

Figure 8:
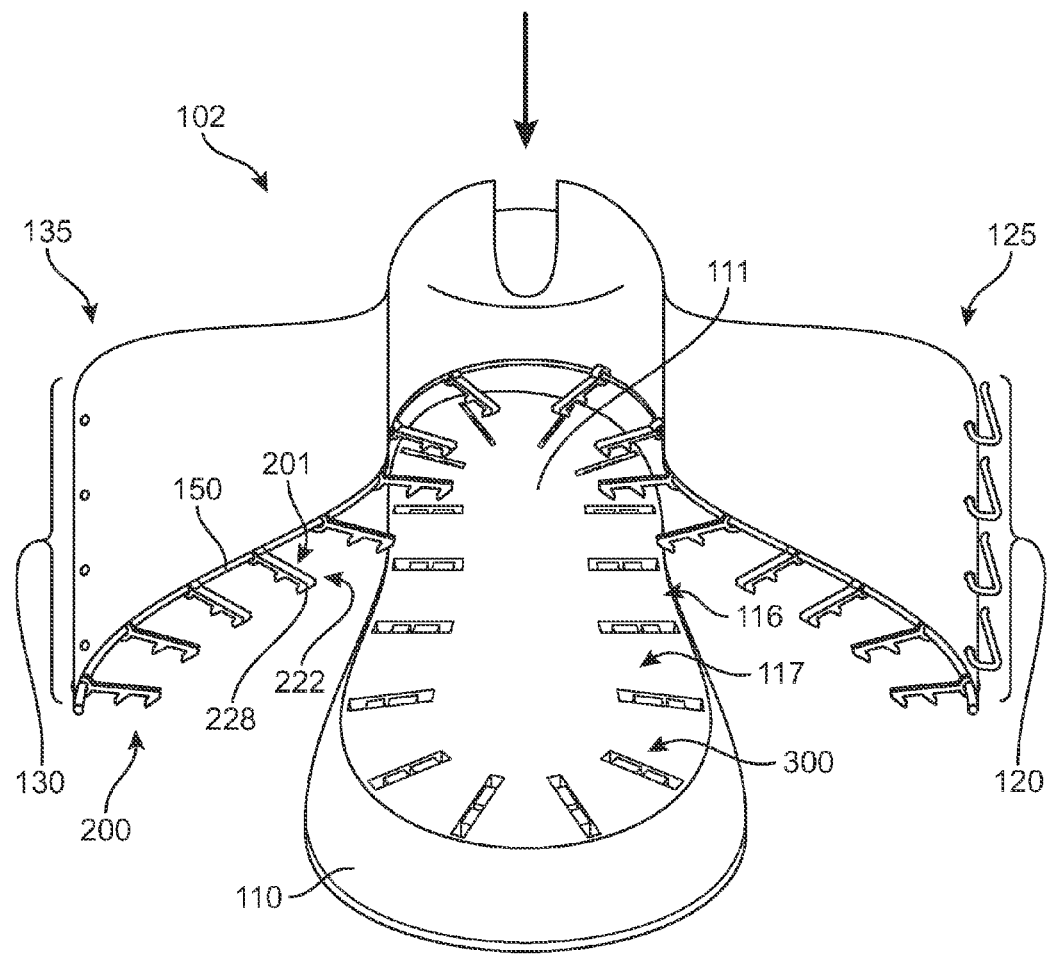

In FIG. 8, upper 102 and elongated members 200 are arranged for assembly with sole structure 110. To align elongated members 200 with corresponding recesses 300, elongated members 200 may be oriented so that they extend inwardly from outer peripheral portion 116 of top surface 111 to interior portion 117 of top surface 111. For example, tip 228 of second end portion 222 of first elongated member 201 points generally in a direction toward interior portion 117. Because elongated members 200 are rotatably coupled to cord element 150, each elongated member can easily be rotated into a position that aligns the elongated member with a corresponding recess on top surface 111.

Figure 9:
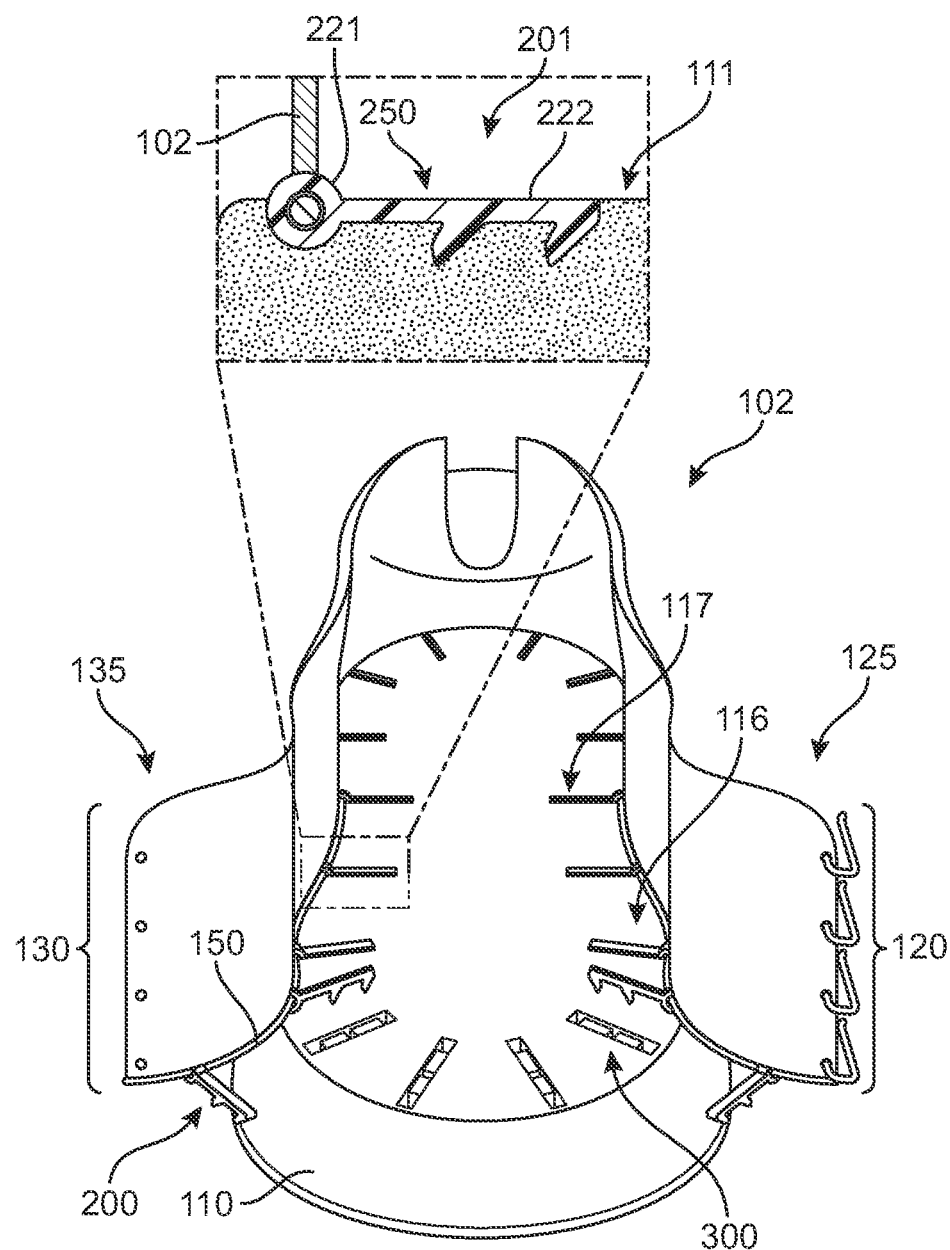

FIG. 9 shows upper 102 partially connected to sole structure 110 via elongated members 200. Once elongated members 200 are engaged with recesses 300, a portion of elongated members 200 are generally co-planar, or flush, with recesses. For example, in FIG. 9, top surface 250 of second end portion 222 of first elongated member 201 is approximately co-planar with top surface 111 of sole structure 110.

In at least some embodiments, the rounded geometry of first end portion 221 of first elongated member 201 may provide a portion of first elongated member 201 that extends outwardly from first recess 301 when first elongated member 201 is inserted into first recess 301. In other words, in some cases, first end portion 221 may not be flush with top surface 111, while second end portion 222 may generally be flush with top surface 111. In other embodiments, first end portion 221 could be flattened along top surface 250 of elongated member 201 so that first end portion 221 is approximately flush with top surface 111 of sole structure 110.

Figure 10:
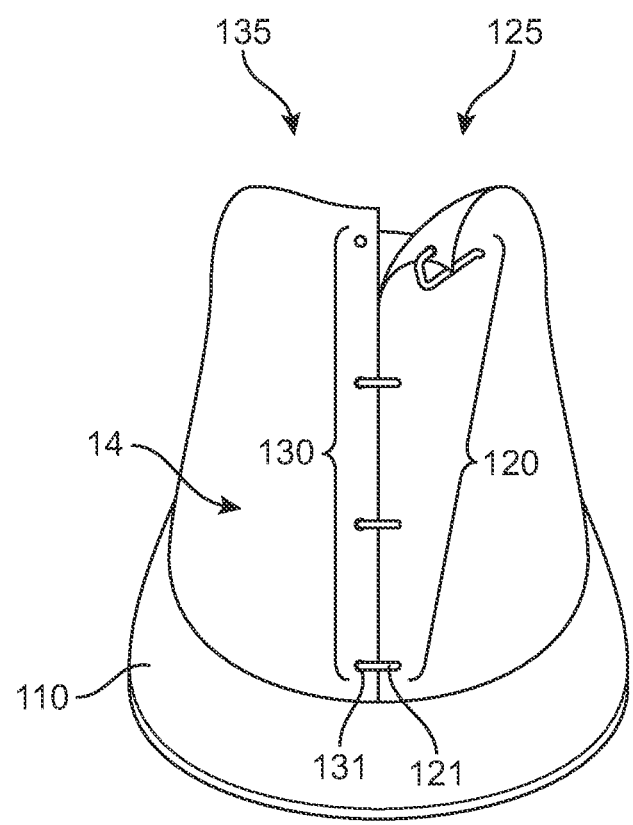

FIG. 10 shows upper 102 with first end 125 of heel portion 14 attached to second end 135 of heel portion 14 by passing heel straps 120 through apertures 130. For example, first heel strap 121 first passes through first aperture 131 to help secure first end 125 to second end 135.

Figure 11:
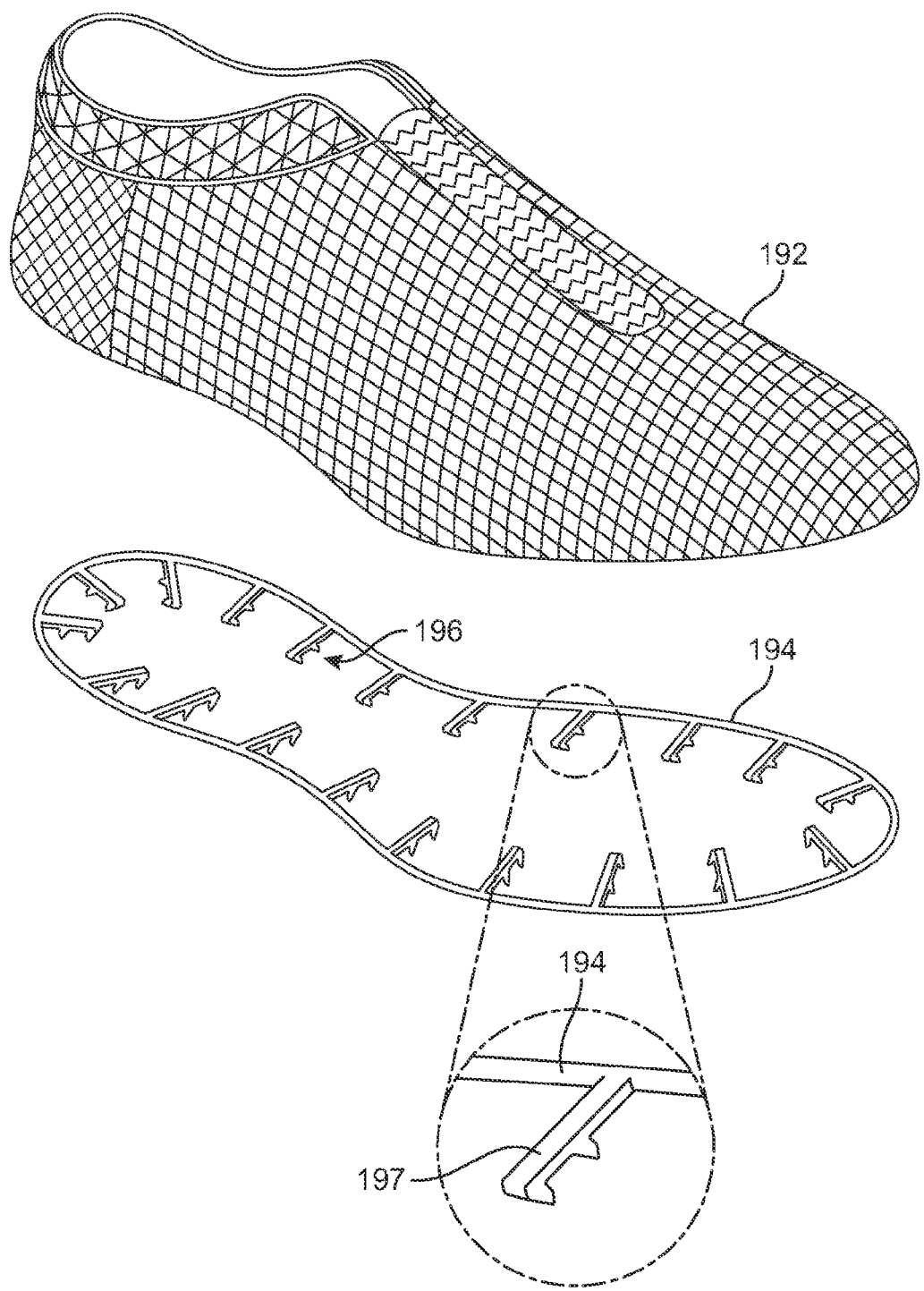
FIG. 11 is an exploded isometric view of an embodiment of an upper and a cord element with integrally formed elongated members.

FIG. 11 illustrates an isometric exploded view of another embodiment of an article having upper 192 coupled to cord element 194 and elongated members 196. FIG. 11 further includes an enlarged view of one elongated member 197 and a portion of cord element 194. For purposes of illustration, a corresponding sole structure is not shown in FIG. 11. In some embodiments, the corresponding sole structure may be similar in some or all respects to sole structure 110 discussed above and shown in FIGS. 6-9.

In the embodiment of FIG. 11, cord element 194 and elongated members 196 may be integrally formed, rather than having elongated members 196 separately formed and coupled to cord element 194. For example, an elongated member 197 is seen to be integrally formed with cord element 194. Cord element 194 could be further assembled with upper 192 in a manner that allows cord element 194 to at least partially rotate or twist with respect to upper 192. In some cases, for example, cord element 194 could be attached to upper 192 using various kinds of fasteners that allow for relative movement of cord element 194 and upper 192. In one embodiment, for example, cord element 194 could be attached to upper 192 using clips or bands. Such a configuration might therefore allow for relative movement of elongated members 196 and upper 192, which facilitates the assembly of elongated members 196 with a corresponding sole structure. For example, upper 192 with cord element 194 and elongated members 196 may be assembled with a corresponding sole structure in a substantially similar manner to the assembly of upper 102 with sole structure 110 shown in FIGS. 7-10.

The method described in FIGS. 7-10 offers several advantages over other possible attachment means (for example, sewing or gluing) of an upper to a sole structure. First, elongated members 200 are "non-destructively removable" from sole structure 110 of article of footwear 100. In other words, elongated members 200 may be removed from sole structure 110 without destroying, tearing, and/or breaking either upper 102 and/or sole structure 110. This allows components of article of footwear 100 to be interchangeable. For example, upper 102 may be connected to a new sole structure (not shown), which may replace sole structure 110 that becomes damaged. Or, the new sole structure may offer a different comfort or feel. Alternatively, sole structure 110 can be attached to a new upper providing a different comfort, feel, and/or aesthetic appeal. Further, using elongated member 200 may decrease the number of distinct materials used to manufacture article 100 in contrast to embodiments that require thread, glue, or other adhesives, thereby reducing manufacturing costs.

The design of elongated members 200 offers further advantages. For example, angle 800 (see FIG. 5) between first protrusion 225 and bottom surface 240 of second end portion 222 may be selected according to the optimal configuration for securing elongated members 200 within recesses 300. In other words, first protrusion 225 and second protrusion 226, coupled with first notch 325 and second notch 326, offer a mechanical configuration sufficient to maintain attachment between upper 102 and sole structure 110.

Generally, elongated members 200 are not disconnected from recesses 300 unless a wearer manually (and intentionally) disconnects elongated members 200 from recesses 300. When a foot and/or liner is disposed within article 100, elongated members 200 may be prevented from disconnecting with recesses 300 as the foot and/or liner tends to restrict any vertical movement necessary for removal. Moreover, the protrusions of elongated members 200 (e.g., first protrusion 225 and second protrusion 226) when engaged with notches (e.g., first notch 325 and second notch 326) act to restrict the horizontal motion of elongated members 200. In particular, as upper 102 pulls or tugs on elongated members 200 in a direction toward outer peripheral portion 116 of sole structure 110, the protrusions help prevent elongated members 200 from being pulled out of corresponding recesses 300.

In order to offer additional comfort, in some embodiments an insole and/or other liner (not shown) may be inserted over top surface 111 of sole structure 110 after elongated members 200 engage recesses 300.

Figure 12:
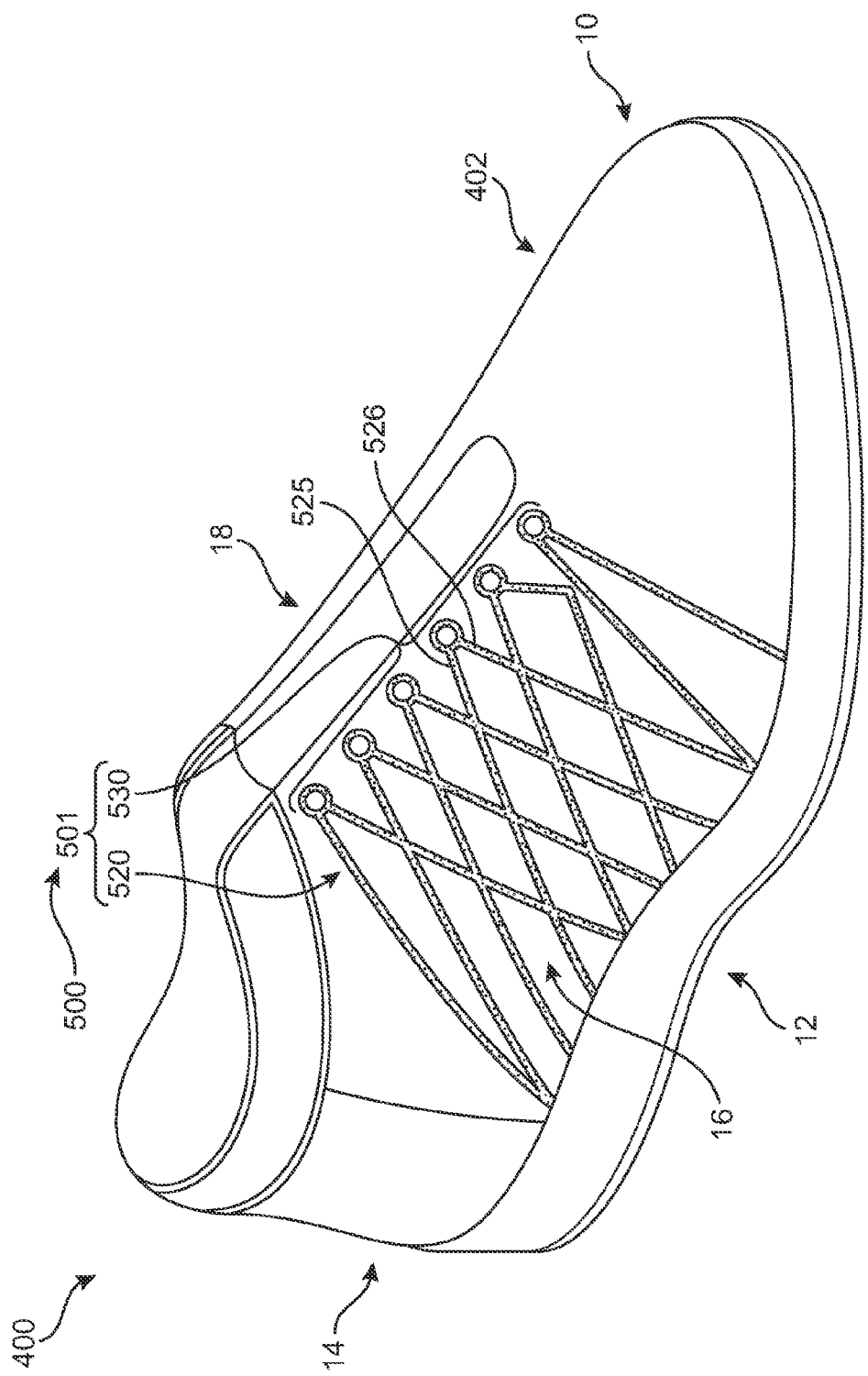
FIG. 12 an isometric side view of an another embodiment of an article of footwear having alternate elongated members.

In another embodiment, an article of footwear may include an upper made from a material, such as a textile material or leather material, with the upper having structures printed onto the upper by a three-dimensional printer. For example, in FIG. 12, upper 402 of article of footwear 400 (also referred to as simply article 400) includes several printed structures 500 printed on the lateral side 16 of upper 402 as well as the medial side (not shown) of upper 402. Printed structures 500 include first printed structure 501 on lateral side 16 of article 400. First printed structure 501 includes extended portions 520 and fastener receiving portions 530. As shown in FIG. 12, extended portions 520 generally extend vertically along upper 402. For example, extended portions 520 include first extended portion 525 and second extended portion 526. In other embodiments, extended portions 520 may extend in a non-linear manner, such as a wavy-pattern or a zigzag pattern. Further, extended portions 520 may be at least partially embedded in upper 402 with the embedded portion bonding to individual fibers (not shown) in upper 402. The embedded portion of extended portions 520 extends below the exterior surface of upper 402, while the remaining non-embedded portion of extended portions 520 extends above the exterior surface of upper 402. Moreover, extended portions 520 are generally anchored into upper 402 and free from movement. Although extended portions 520, as shown in FIG. 12, extend generally along midfoot portion 12 of article 400, extended portions 520 may also extend along forefoot portion 10 and/or heel portion 14.

Fastener receiving portions 530 are generally configured to receive a lacing system (not shown), such as shoelaces. As shown in FIG. 12, fastener receiving portions 530 may be looped structures. In some embodiments, fastener receiving portions 530 are at least partially embedded in upper 402 with the embedded portion bonding to individual fibers (not shown) in upper 402. In the embodiment shown in FIG. 12, fastener receiving portions 530 are not bonded to upper 402 and are free to move with a lacing system. In other words, fastener receiving portions 530 may be separated from upper 402. Although not shown, article of footwear 400 includes printed structures 500 having a second printed structure on the medial side 18 of article 400. The second printed structure may vary in any way described for the first printed structure 501.

Figure 13:
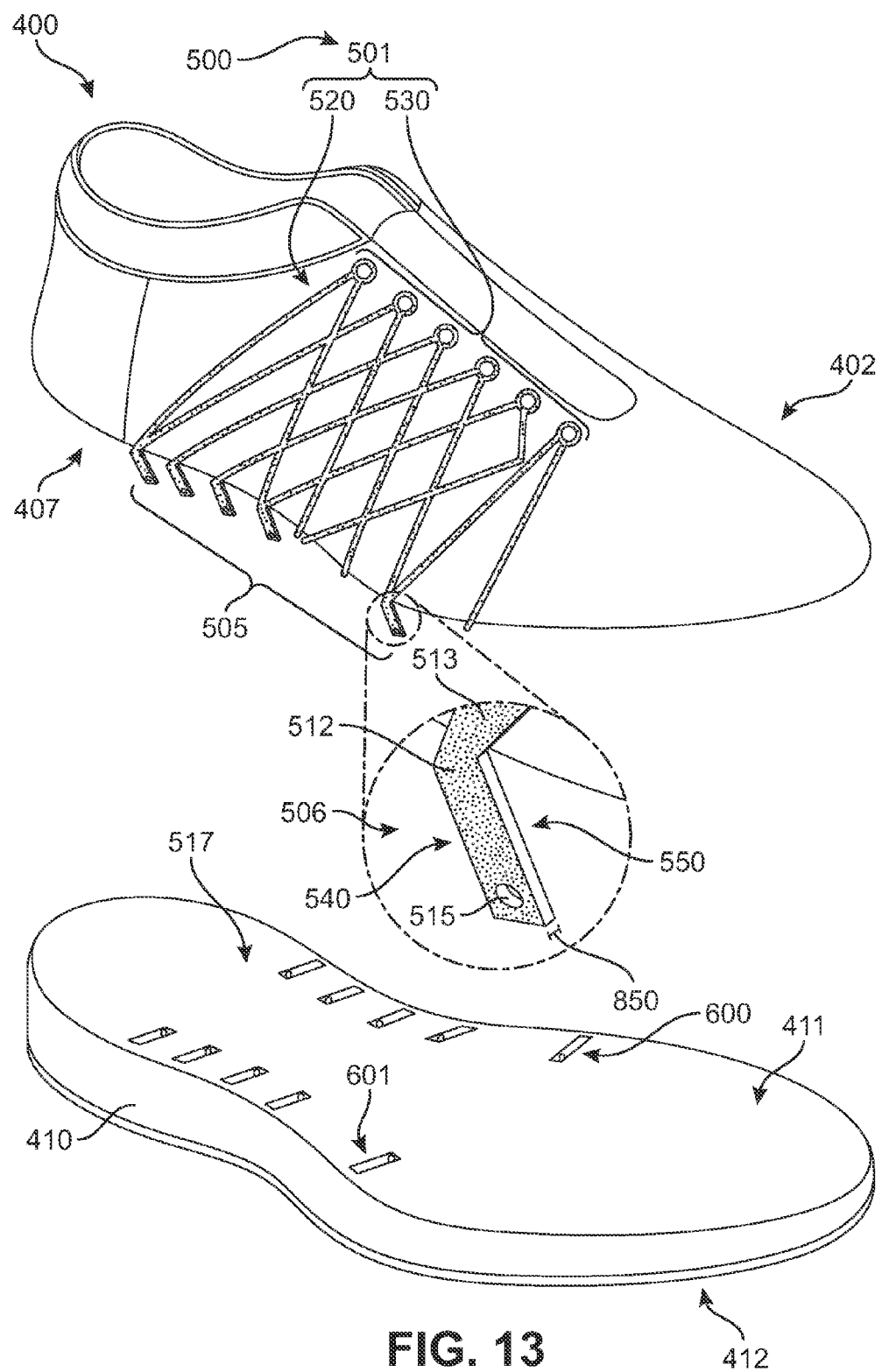
FIG. 13 is an exploded isometric view of the embodiment in FIG. 12, showing the upper, elongated members, and a sole structure.
Figure 14:
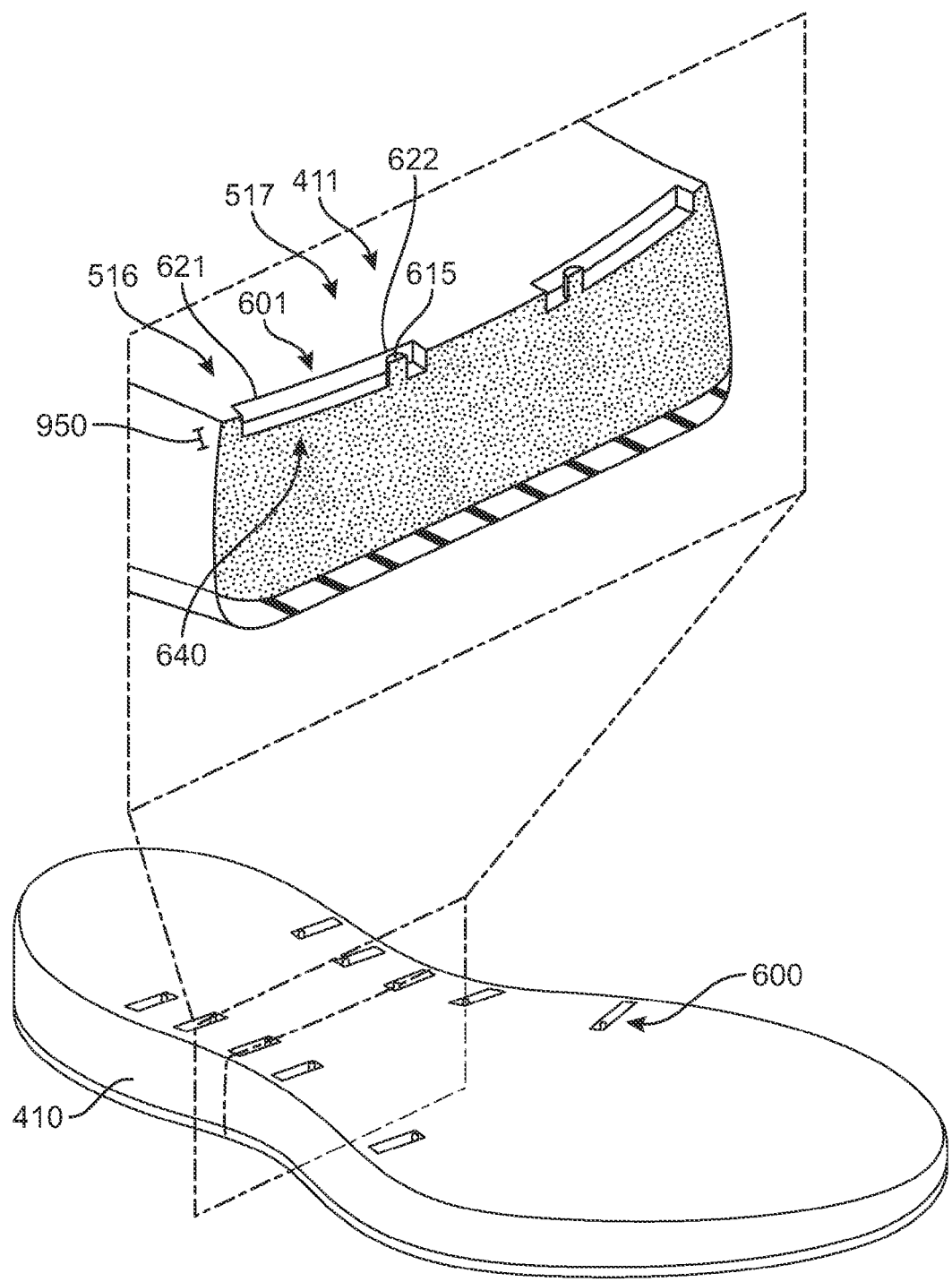
FIG. 14 is an isometric view of the sole structure in FIG. 13, with a cross-sectional view of the sole structure.

FIGS. 13-14 illustrate another embodiment of elongated members used to secure or fasten an upper to a sole structure. As shown in FIG. 13, printed structures 500 further include several elongated members 505 extending from lower peripheral portion 407 of upper 402. Elongated members 505 are printed from a printable material that could vary in any manner as previously described in the earlier embodiment. Generally, elongated members 505 are flexible and can bend and/or twist without tearing and/or breaking. Although elongated members 505 in FIG. 13 are generally shown on lateral side 16 of upper 402, elongated members may also be located on forefoot portion 10 and/or heel portion 14.

FIG. 13 further shows elongated members 505 having apertures. For example, first elongated member 506 includes first aperture 515. In some embodiments, first aperture 515 may be square or rectangular. In the embodiment shown in FIG. 13, first aperture 515 is generally circular. Also, in other embodiments, first elongated member 506 may further include a second aperture. Still, in other embodiments, first elongated member 506 may further include at least three apertures. First elongated member 506 further includes exterior surface 540 and interior surface 550 on a surface opposite exterior surface 540. Further, first elongated member 506 includes thickness 850, where thickness 850 extends from exterior surface 540 to interior surface 550. Thickness 850 may vary in the range of approximately 0.2 mm to 9 mm.

Also, FIGS. 13-14 illustrate sole structure 410 configured to attach to upper 402. Sole structure 410 includes top surface 411 having recesses 600. Sole structure 410 further includes bottom surface 412 disposed opposite of top surface 411. Bottom surface 412 is generally intended to contact a ground surface (not shown).

Recesses 600 are disposed on top surface 411, and are configured to receive elongated members 505. For example, first recess 601 of recesses 600 may be configured to receive first elongated member 506. Referring to FIG. 14, recesses 600 include at least one protrusion. For example, first recess 601 includes first protrusion 615.

Recesses 600 may be further arranged such that a first end of each recess is disposed in an outer peripheral portion of top surface 411, while a second end of each recess is disposed in an interior portion of top surface 411. For example, as shown in FIG. 14, first recess 601 has first end portion 621 disposed in outer peripheral portion 516 of top surface 411. First recess 601 also has second end portion 622 disposed in interior portion 517 (also see FIG. 13) of top surface 411.

As shown in FIG. 13, in order to secure upper 402 to sole structure 410, elongated members 505 are configured to bend inward toward interior portion 517 of top surface 411 of sole structure 410. For example, first elongated member 506 may bend with respect to an extended portion 513 at bending portion 512. Then, recesses 600 engage elongated members 505. For example, as shown in FIGS. 13 and 14, first protrusion 615 is configured to engage first aperture 515 of first elongated member 506. First protrusion 615, as shown in FIG. 14, is generally cylindrical. However, in other embodiments, first protrusion 615 may have a square or rectangular cross section. Generally, first protrusion 615 has a cross section that is substantially similar in size and shape to aperture 515 of first elongated member 506. Also, in other embodiments, first recess 601 may further include a second protrusion. Still, in other embodiments, first recess 601 may further include at least three protrusions. Although the number of protrusions may vary, the number of protrusions in first recess 601 may generally be similar to the number of apertures on first elongated member 506.

Referring again to FIG. 14, first recess 601 includes first depth 950. First depth 950 extends from bottom surface 640 of first recess 601 to top surface 411 of sole structure 410. Although first depth 950 may vary, first depth 950 is generally at least as large as thickness 850 of first elongated member 506. In some embodiments, first depth 950 is substantially similar to thickness 850. For example, in the embodiment shown in FIG. 13, thickness 850 is generally similar to first depth 950, and accordingly, when exterior surface 540 of first elongated member 506 engages bottom surface 640 of first recess 601, interior surface 550 of first elongated member 506 may be generally co-planar, or flush, with top surface 411 of sole structure 410. In other embodiments, interior surface 550 of first elongated member 506 may not be co-planar with top surface 411 of sole structure 410. For example, thickness 850 could be greater than first depth 950 so that interior surface 550 of first elongated member 506 is elevated with respect to top surface 411 of sole structure 410. Alternatively, first depth 950 could be greater than thickness 850 so that top surface 411 of sole structure 410 is elevated with respect to interior surface 550 of first elongated member 506.

In some embodiments, some of the components comprising the articles described above and shown in FIGS. 1-14 may be formed using a three-dimensional printer. However, in other embodiments, these structures could be manufactured by means other than a three-dimensional printer. For example, other embodiments could use injection molding. Further, attachment means (of elongated members to an upper) could include ultrasonic welding or radio frequency welding in order to create an upper having attached portions and fastener receiving portions.

Figure 15:
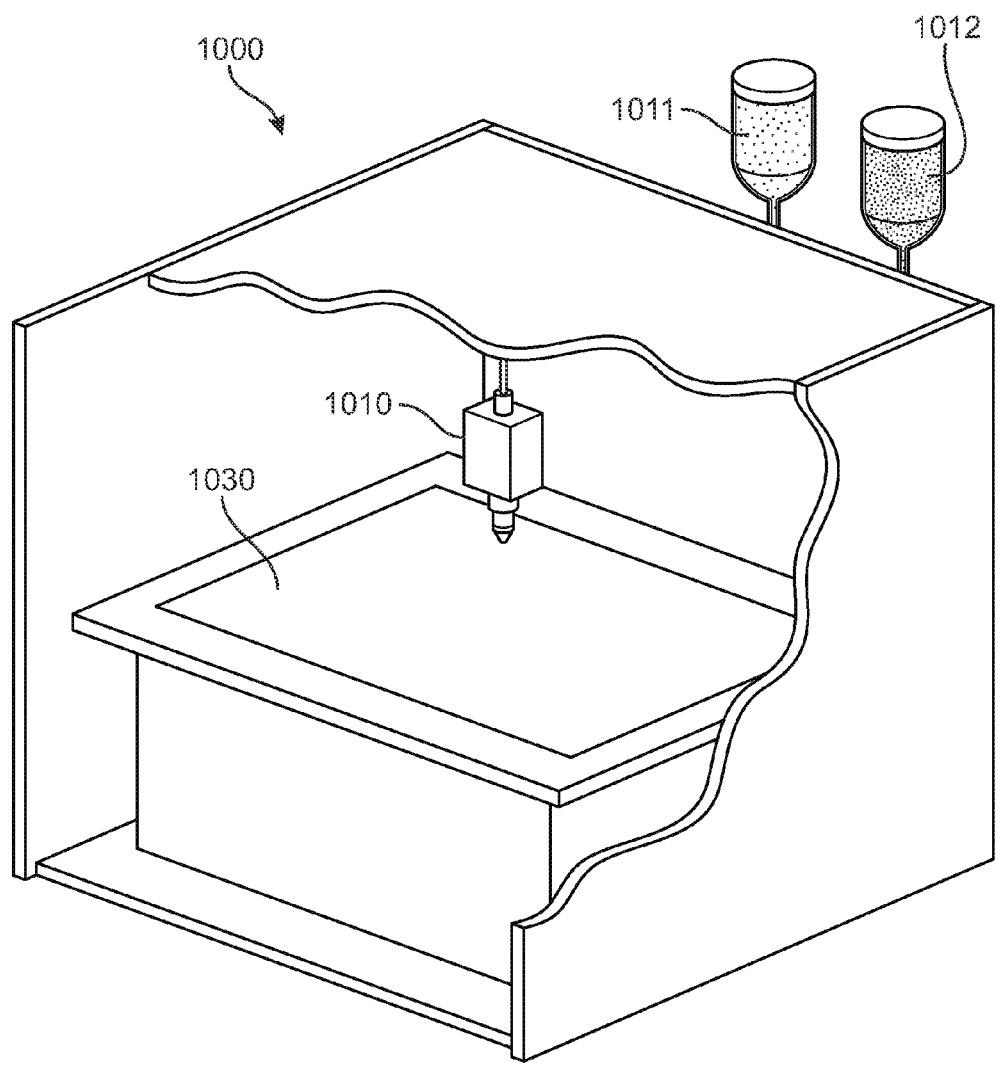
FIG. 15 is a schematic view of an embodiment of a three-dimensional printer.

FIG. 15 illustrates three-dimensional printer 1000. Three-dimensional printer 1000 could be, for example, a Maker-Bot® Replicator™ 2. Three-dimensional printer 1000 is connected to a power source (not shown) in order to supply a current to three-dimensional printer 1000. Three-dimensional printer 1000 further includes print head 1010 capable of moving in three dimensions and disposing a printable material to form a three-dimensional object, including an upper or other portions of an article. In the embodiment shown in FIG. 15, print head 1010 is capable of delivering first printable material 1011 and second printable material 1012 onto surface 1030 of three-dimensional printer 1000 in order to form portions of an article. In other embodiments, a first print head and a separate second print head are used to dispose first printable material 1011 and second printable material 1012, respectively, onto surface 1030.

Figure 16:
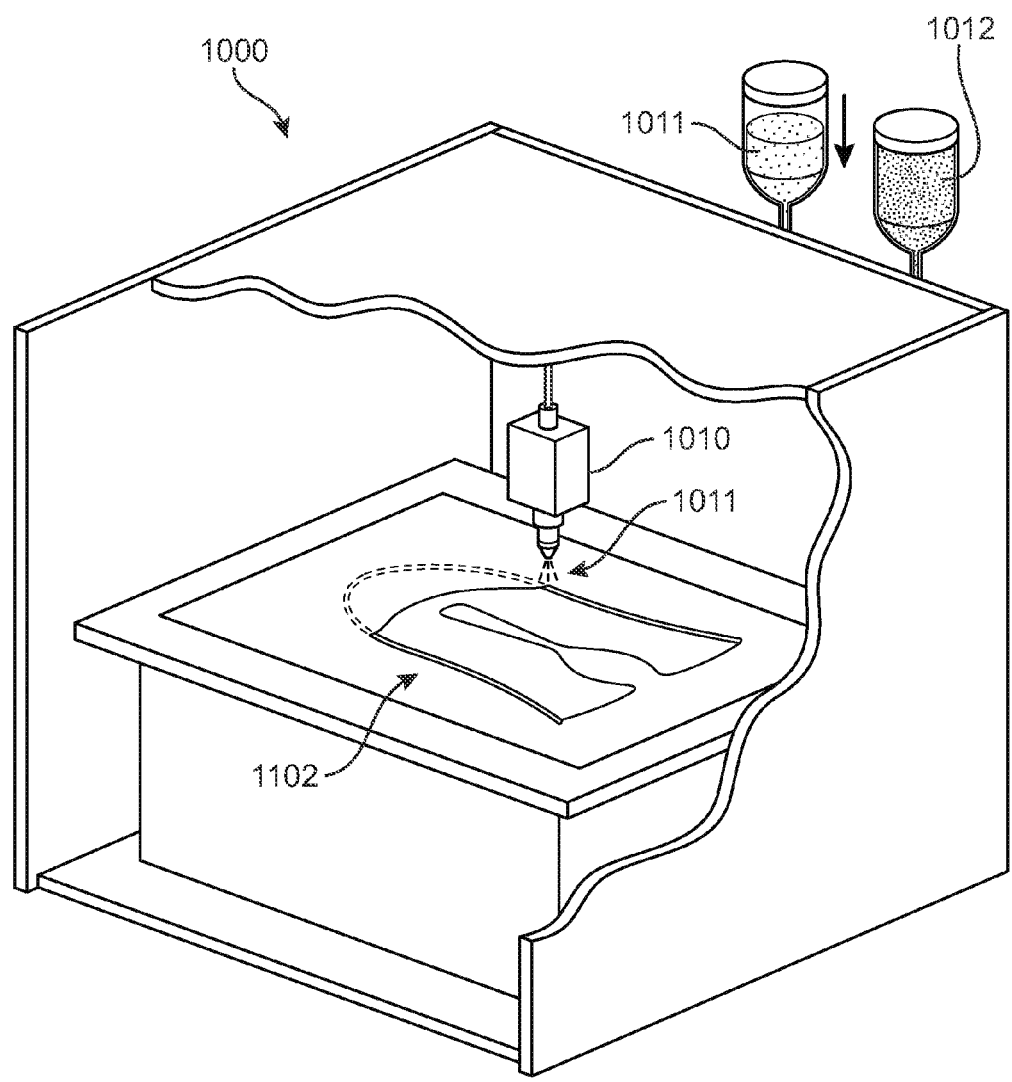
FIGS. 16-17 are schematic views of steps in a method of printing an upper, and printing elongated members onto the upper, according to an embodiment.
Figure 17:
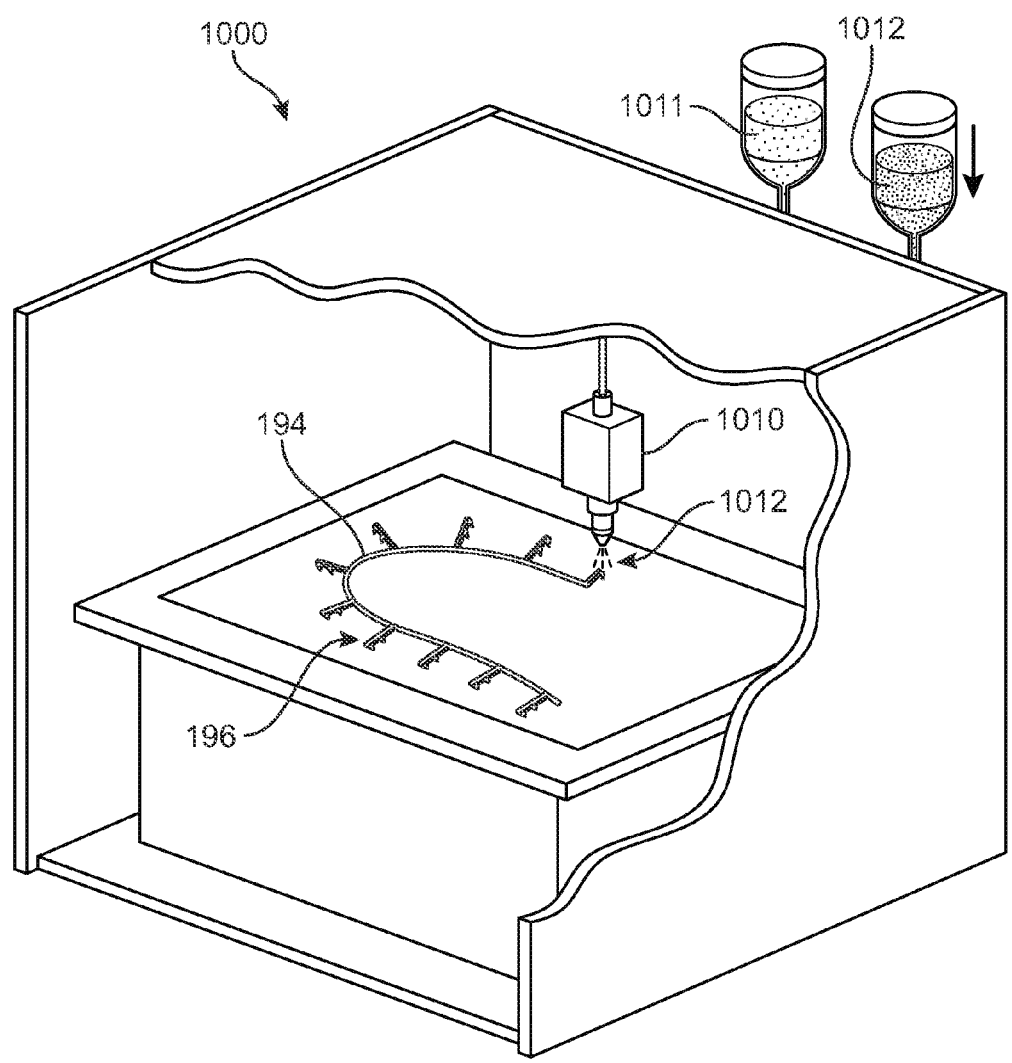
Figure 18:
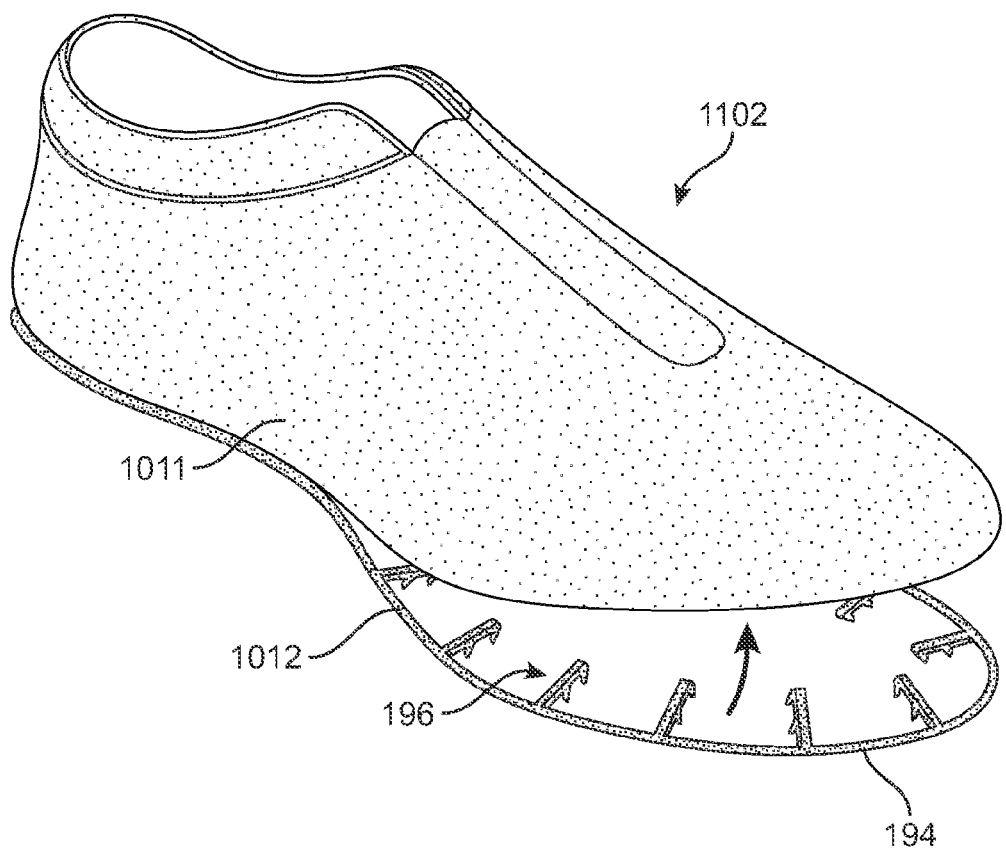
FIG. 18 is an isometric view of the upper and elongated members shown in FIGS. 15-17, according to an embodiment.

FIGS. 16-18 illustrate upper 102 and elongated members 200 being printed in three-dimensional printer 1000. Three-dimensional printer 1000 is capable of printing multiple printable materials of varying densities and strengths. For example, first printable material 1011 could have a first density and first tensile strength, and second printable material 1012 could have a second density and second tensile strength. In some embodiments, first printable material 1011 has a higher density and higher tensile strength than second printable material 1012. In the embodiment shown in FIGS. 16-18, second printable material 1012 has a higher density and higher tensile strength than first printable material 1011. It should be understood a more dense printable material or a printable material having a higher tensile strength may create a more rigid structure made to additionally resist tearing, breaking, bending, and/or deforming. As used herein, the density of first printable material 1011 and second printable material 1012 refer to densities of these materials in a cured state.

FIG. 16 shows a portion of upper 1102 printed in three-dimensional printer 1000. Three-dimensional printer 1000 uses first printable material 1011 to print upper 1102. In other embodiments, upper 1102 is made from second printable material 1012. Still, in other embodiments, upper 1102 could be made from a combination of first printable material 1011 and second printable material 1012.

As shown in FIG. 17, cord element 194 with integrally formed elongated members 196 may be printed using three-dimensional printer 1000. As shown in FIG. 17, in some embodiments, cord element 194 and elongated members 196 are printed with second printable material 1012. In some other embodiments, cord element 194 and elongated members 196 are printed with first printable material 1011. Still, in other embodiments, cord element 194 and elongated members 196 could be printed with a combination of first printable material 1011 and second printable material 1012.

In FIG. 18, cord element 194 with integrally formed elongated members 196 may be coupled with upper 1102. This coupling may be achieved using any means known in the art, and in at least some cases may be selected so that cord element 194 and elongated members 196 can move related to upper 1102 (e.g., via rotation or twisting).

As indicated schematically in FIG. 18, upper 1102 is formed from first printable material 1011, while cord element 194 and elongated members 196 are formed from second printable material 1012. As discussed above, in at least some embodiments, first printable material 1011, when cured, may be less rigid than second printable material 1012. This configuration may allow for upper 1102 to stretch and flex around a foot, while cord element 194 and elongated members 196 may generally resist stretching in order to maintain a strong connection with a corresponding sole structure.

Several other possible configurations for coupling elongated members and an upper during, or after, printing of these components are possible. In one embodiment, elongated members with apertures for receiving a cord could be printed separately from the cord and the upper, and at a later time coupled to the cord (e.g., by inserting the cord through the apertures of the elongated members). Then, the cord and elongated members could be further assembled with the printed upper.

It is contemplated that in at least one embodiment, the process of printing may include separately printing an upper, a cord, and elongated members. Then, after printing each component separately, the elongated members could be coupled to the cord (e.g., by passing the cord through apertures of the elongated members). The assembled cord and elongated members could then be further coupled to the upper. Optionally, a cord may not be printed, but could be assembled with elongated members and/or an upper after the upper and elongated members have been separately printed.

As already discussed, elongated members may be configured as mechanical connectors in at least some embodiments. In particular, elongated members may also be referred to as mechanical connectors when the elongated members have provisions for engaging recesses in a sole structure.

Figure 19:
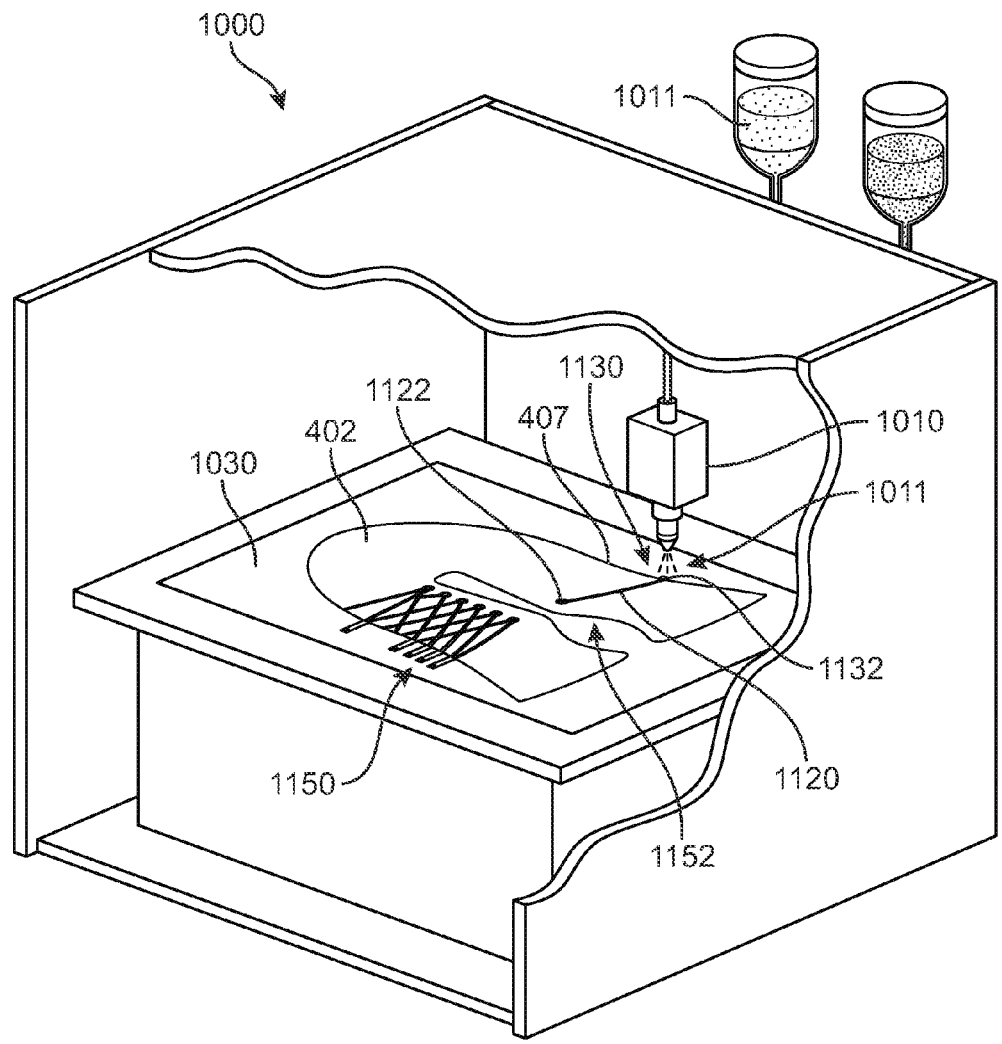
FIGS. 19-20 are schematic views of steps in a method of printing mechanical connectors onto an upper, according to an embodiment.
Figure 20:
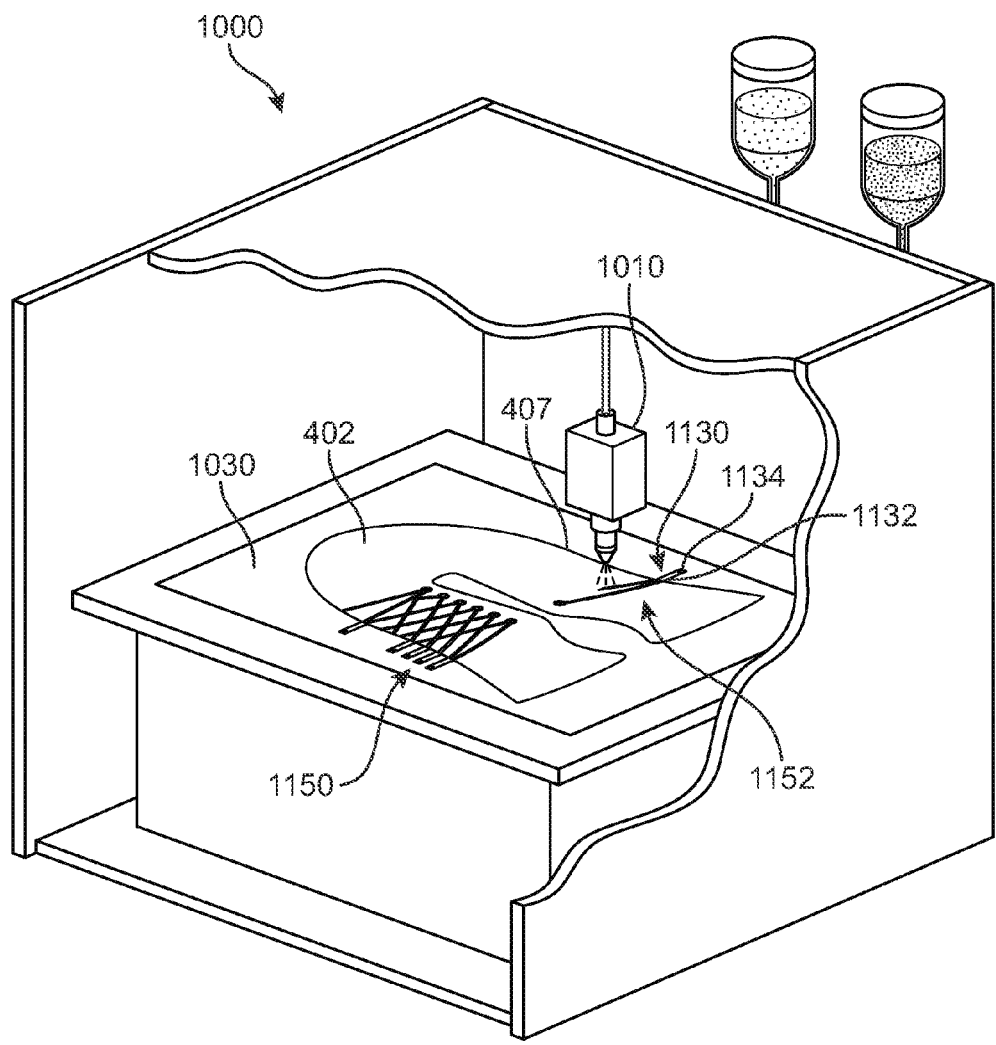

FIGS. 19 and 20 illustrate an embodiment of a method of forming the upper and elongated members for article of footwear 400 using three-dimensional printer 1000, which is discussed above and shown in FIGS. 12-14. As shown in FIG. 19, upper 402 may be associated with surface 1030 during a first step. Optionally, in some cases, upper 402 could be printed using three-dimensional printer 1000 prior to the step shown in FIG. 15. However, in other cases, upper 402 could be manufactured from a textile or other material known in the art for making uppers.

With upper 402 in place, three-dimensional printer 1000 may begin printing printable material 1011 onto upper 402. In FIG. 19, print head 1010 has already printed first printed structure 1150 on one side of upper 402. In the embodiment of FIG. 19, print head 1010 prints extended portion 1120 and fastener receiving portion 1122. In addition, print head 1010 prints first end portion 1132 of elongated member 1130 directly onto lower peripheral portion 407 of upper 402. Elongated member 1130 may be configured to engage a recess in a sole structure, and therefore elongated member 1130 may be a mechanical connector.

Next, as shown in FIG. 20, print head 1010 continues printing second end portion 1134 of elongated member 1130. Here, second end portion 1134 is printed in a manner such that second end portion 1134 is connected to first end portion 1132, but second end portion 1134 is not directly connected to lower peripheral portion 407. Instead, second end portion 1134 extends away from lower peripheral portion 407. In at least some embodiments, elongated member 1130 is printed to have an aperture that can engage a protrusion in a corresponding recess on a sole structure, as discussed previously and shown in FIGS. 13 and 14.

Following this, print head 1010 may continue to print additional extended portions, fastener receiving portions, and elongated members of a second printed structure 1152. As discussed above, each elongated member may be a mechanical connector. For example, elongated member 1130 is a mechanical connector that is configured to connect to an associated sole structure (e.g., sole structure 410 of FIG. 13). Moreover, the printed mechanical connectors, which have been printed directly to upper 402, may engage recesses 600 in sole structure 410 to facilitate assembly of article of footwear 400 (see FIG. 13).

In some embodiments, an upper may include material of varying densities and flexibility. As discussed previously, first printable material 1011 and second print material 1012 may have different properties. For example, first printable material 1011 may have a lower density than second printable material 1012. Additionally, first printable material 1011 may be more flexible than second printable material. Further, second printable material 1012 may have greater tensile strength than first printable material 1011. Additionally, other properties may vary between first printable material 1011 and second printable material 1012.

Figure 21:
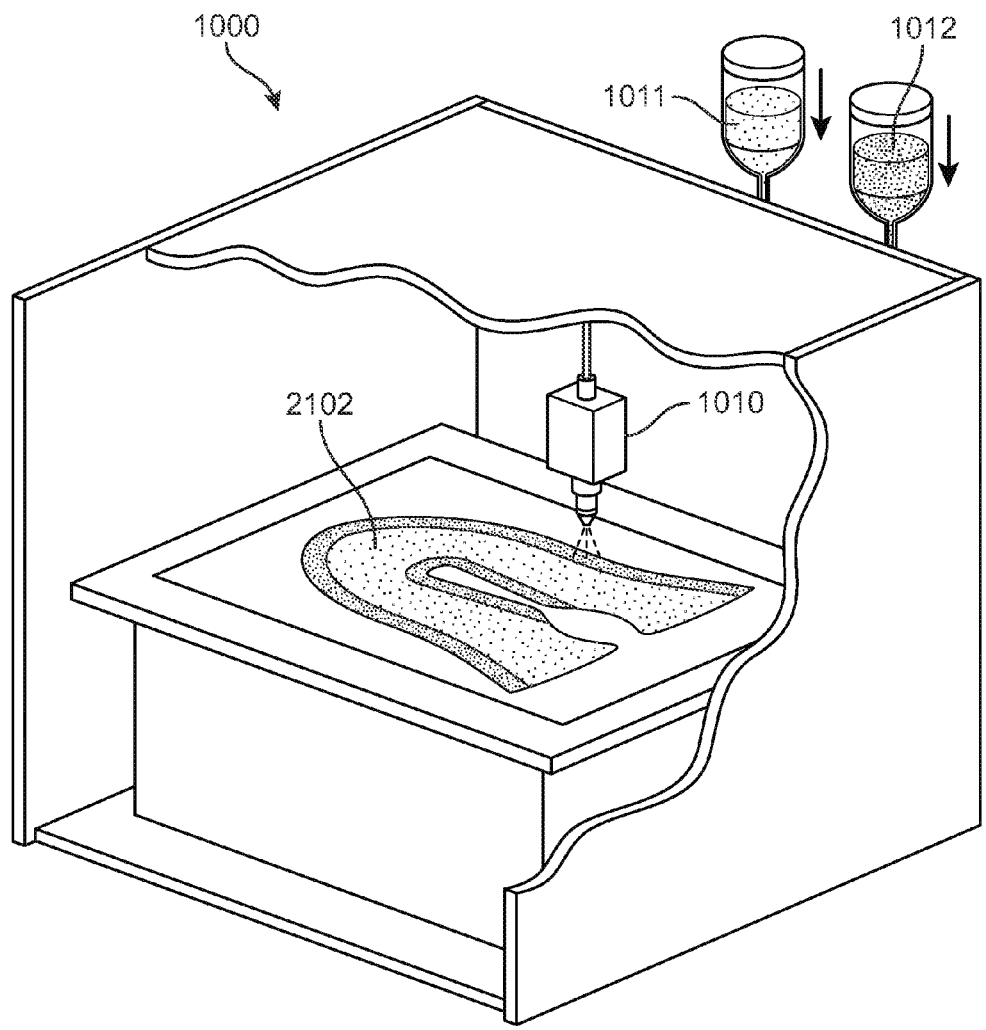
FIG. 21 is a schematic view of a step in a method of printing an upper.

In some embodiments, various printable materials may be combined to provide desired properties throughout the upper. As shown in FIG. 21, in some embodiments, multiple printable materials may be passed through print head 1010 of three-dimensional printer 1000 at the same time. In some embodiments, two or more printable material may pass through print head 1010 at the same time. For example, in some embodiments, both first printable material 1011 and second printable material 1012 may pass through print head 1010 at the same time to form a portion of upper 2102. The combination of first printable material 1011 and second printable material 1012 may form a material composition that has a combination of the properties of first printable material 1011 and second printable material 1012.

In some embodiments, the ratio of various printable materials may be varied through the upper. For example, in some embodiments, an area of the upper that may be more likely to experience high levels of stress or force may include a larger percentage of a printable material that has a higher tensile strength than other printable materials, for example, second printable material 1012. Other areas of the upper may include a percentage of a flexible material such as first printable material 1011 to improve comfort and feel as well as to allow increased flexing as compared to areas formed with a higher percentage of second printable material 1012. The ratio of different printable materials within a given volume of composite material may be varied by incorporating a different volume or amount of printable material into the composite material. For example, a composite material of a given volume of 10 cubic millimeters may incorporate 5 cubic millimeters of first printable material 1011 and 5 cubic millimeters of second printable material 1012. Additionally, a composite material of 10 cubic millimeters may incorporate 7 cubic millimeters of first printable material 1011 and 3 cubic millimeters of second printable material 1012. By varying the amount of first printable material 1011 and second printable material 1012, the ratio of first printable material 1011 to second printable material 1012 may be varied in any give composite material.

Figure 22:
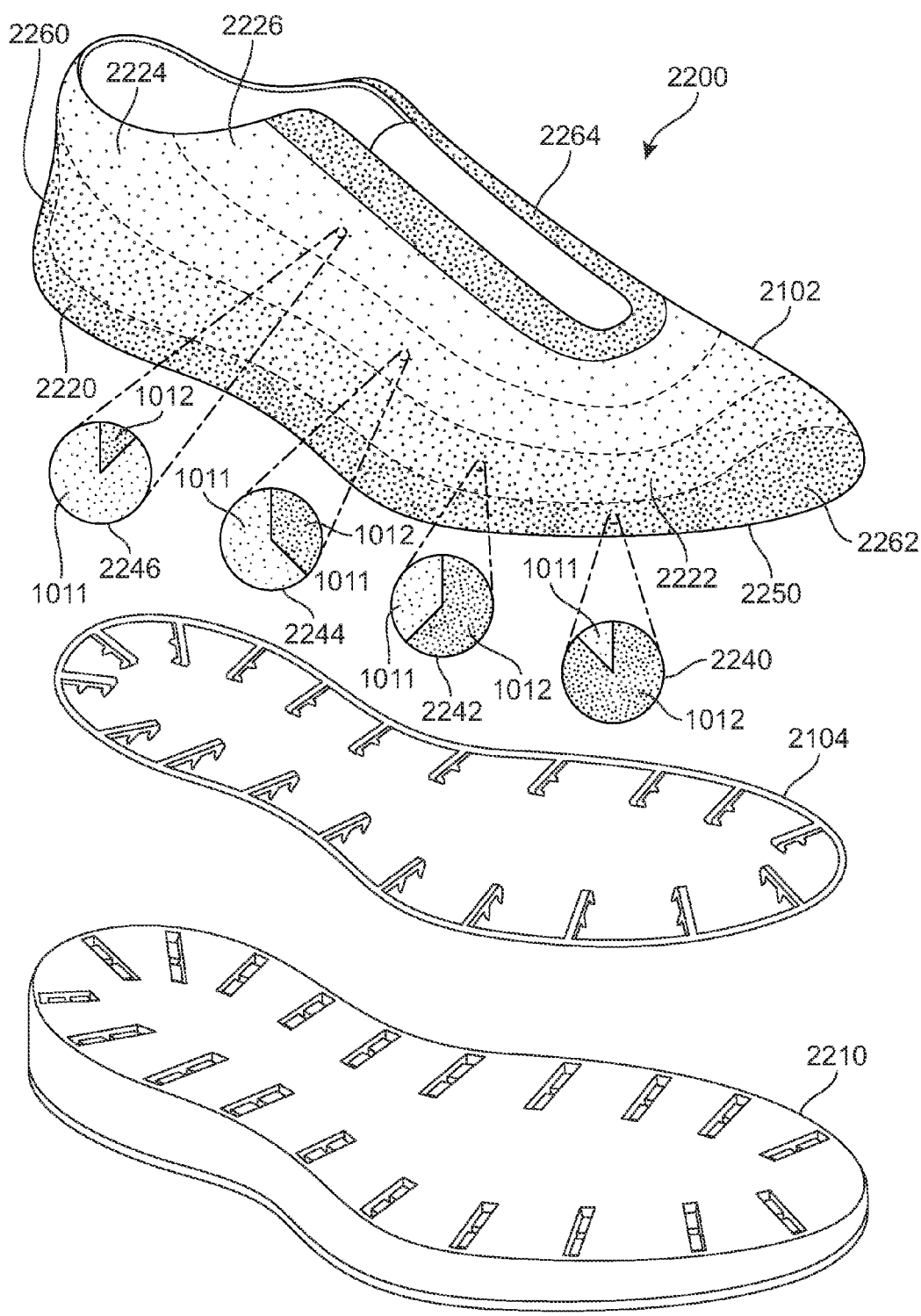
FIG. 22 is an exploded isometric view of an embodiment of an article of footwear.

Referring now to FIG. 22, an exploded view of an article of footwear is depicted. As shown, article 2200 includes upper 2102, cord element 2104, and sole structure 2210. Upper 2102 may include areas that are formed with various percentages of first printable material 1011 and second printable material 1012. Therefore, different areas of upper 2102 may have different properties related to flexibility, rigidity, and other properties of first printable material 1011 and second printable material 1012. As shown in FIG. 22, upper 2102 includes four areas that have various ratios of first printable material 1011 and second printable material 1012. As shown, first portion 2220, second portion 2222, third portion 2224, and fourth portion 2226 are positioned along upper 2102. Although shown in FIG. 22 as separate or distinct areas, it should be recognized that in some embodiments there may not be a precise demarcation of the various areas from one another. For example, in some embodiments, the ratios of printable material may gradually vary between each of the portions, and in some embodiments, the ratios of printable material may vary within each of the portions. Therefore, in some embodiments, individual and distinct portions may not be visible or present because the percentage of printable materials may constantly vary throughout upper 2102.

In some embodiments, the printable material used along the perimeter of the upper may be more rigid than other areas of the upper. In some embodiments, the printable material used along the perimeter may have a higher tensile strength than other areas of the upper to provide a strong connection area to connect upper 2102 to sole structure 2210. As shown in FIG. 22, first portion 2220 extends along perimeter portion 2250 of upper 2102. For purposes of illustration, the relative compositions of two or more materials comprising a composite material in the embodiments may be visually depicted using composition indicators, or simply an indicator. For example, in FIG. 22, the relative percentages of first printable material 1011 and second printable material 1012 of first portion 2220 is shown in indicator 2246. Other percentages of the printable materials may be used in other embodiments. As shown, a large percentage of indicator 2240 is occupied by second printable material 1012. As shown, in some embodiments, the material used to form first portion 2220 may include 5 percent of first printable material 1011 and 95 percent of second printable material 1012. In other embodiments, first portion 2220 may be formed entirely of second printable material. In still further embodiments, first portion 2220 may be formed of a different combination of printable materials. For example, in some embodiments first portion 2220 may be more flexible than other areas of upper 2102 by utilizing a larger percentage of a printable material, such as first printable material 1011, than a more rigid printable material.

In some embodiments, the rigidity, flexibility, and tensile strength of the upper may be varied throughout the upper. As shown in FIG. 22, second portion 2222 may have a lower percentage of second printable material 1012 than first portion 2220. As shown, second portion 2222 may be located toward a central area of upper 2102. In some embodiments, upper 2102 may include larger percentages of first printable material 1011 as the distance away from sole structure 2210 increases. Additionally, third portion 2224 may have a lower percentage of second printable material 1012 than second portion 2222. Further, fourth portion 2226 may have a lower percentage of second printable material 1012 than third portion 2224. As shown, indicator 2242 indicates that the material of second portion 2222 includes about one-third first printable material 1011 and about two-thirds second printable material 1012. The material of second portion 2222, therefore, may be more flexible than the material of first portion 2220; however, second portion 2222 may provide more stretch resistance than other areas of upper 2102. Indicator 2244 indicates that the material of third portion 2224 includes about two-thirds first printable material 1011 and about one-third second printable material 1012. The material of third portion 2224, therefore, may be more flexible than the material of second portion 2222; however, third portion 2224 may provide more stretch resistance than fourth portion 2226. Further, indicator 2246 indicates that fourth portion 2226 is formed of a material that includes about 95 percent first printable material 1011 and about 5 percent second printable material 1012. The material of fourth portion 2226, therefore, may be more flexible than the material of the other portions of upper 2102. Additionally, second printable material 1012 in the material of fourth portion 2226 may provide some additional tensile strength when compared to a printable material formed entirely of first printable material 1011.

In some embodiments, various areas of the upper may have higher percentages of a printable material that has a higher tensile strength than other printable materials used in the upper. For example, in some embodiments, various areas may incorporate a large percentage of second printable material 1012. As shown in FIG. 22, heel counter 2260, toe cap 2262, and instep area 2264 may be composed of a printable material that is rigid and has high tensile strength. In some embodiments, the printable material used to form heel counter 2260, toe cap 2262, and instep area 2264 may be similar in composition to the printable material used to form first portion 2220. That is, in some embodiments, the printable material used to form heel counter 2260, toe cap 2262, and instep area 2264 may have a larger percentage of second printable material 1012 as compared to first printable material 1011. In other embodiments, other areas of upper 2102 may be formed using printable material that has high tensile strength or rigidity to provide support in areas that may be subjected to higher tensile forces than other areas of upper 2102.

Figure 23:
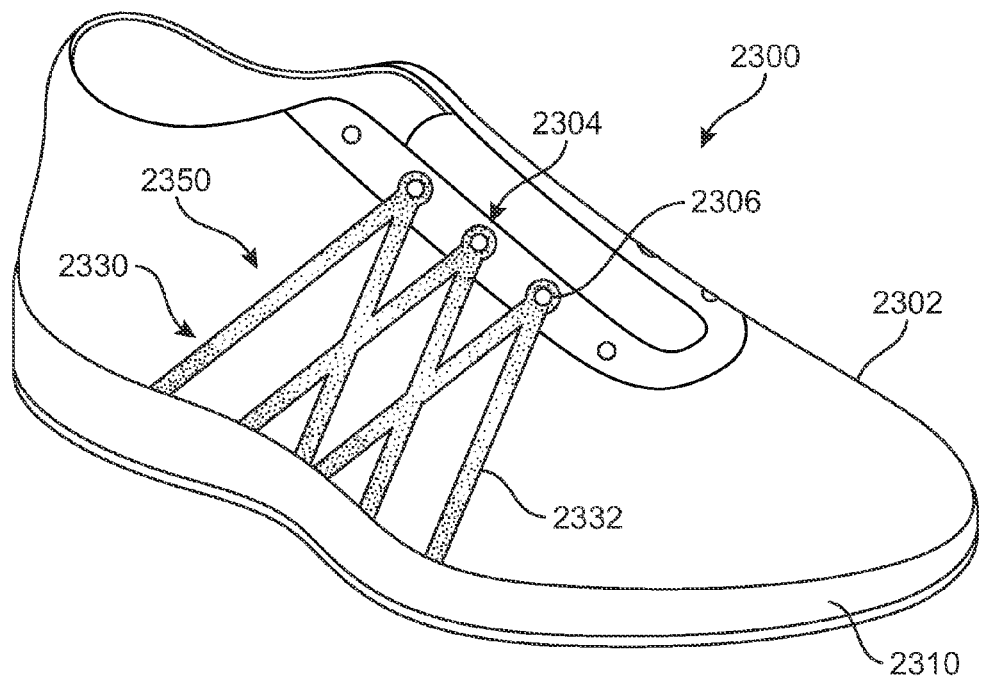
FIG. 23 is an isometric view of an embodiment of an article of footwear incorporating a printed structure.
Figure 24:
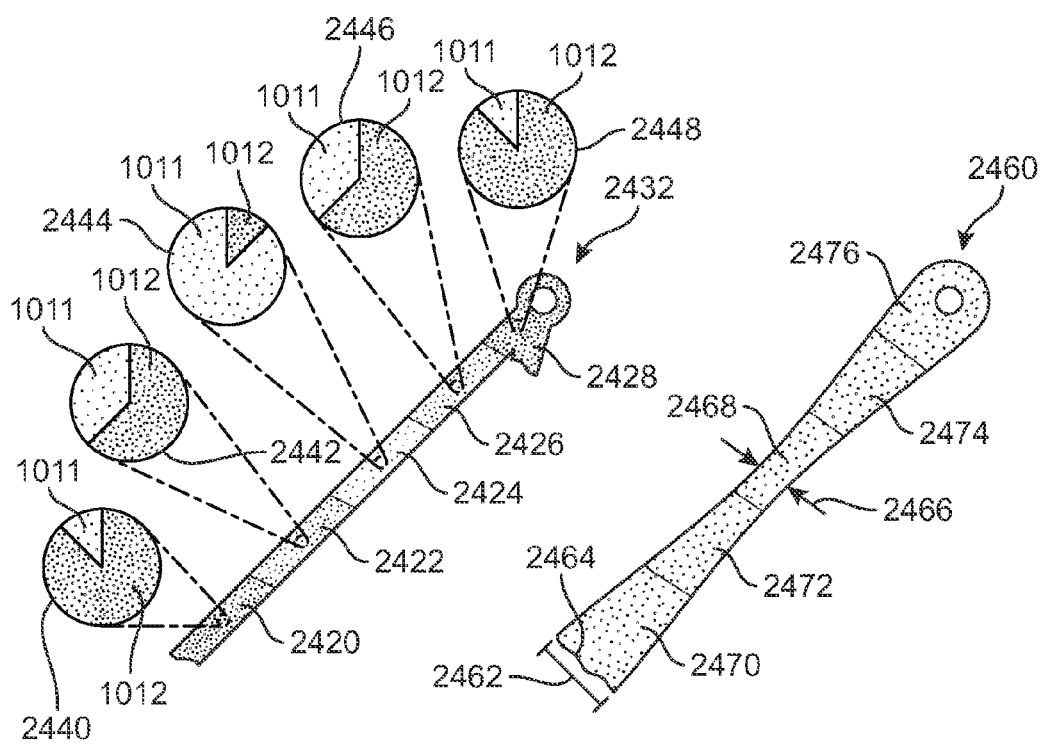
FIG. 24 is a view of multiple embodiments of an extended portion.

Referring now to FIGS. 23 and 24, an alternate embodiment of an article of footwear is depicted. As shown, article 2300 includes printed structure 2350. In some embodiments, printed structure 2350 may include plurality of extended portions 2330. In some embodiments, printed structure 2350 may assist in providing additional structure and support to upper 2302 of article 2300. In some embodiments, plurality of apertures 2304 may be formed within printed structure 2350. In some embodiments, a lace may pass through plurality of apertures 2304 so that the fit of upper 2302 on a user may be adjusted.

In some embodiments, the extended portions of the printed structure may have areas of different densities. For example, the material used to form extended portion 2332 may have a higher density adjacent sole structure 2310 than in the central area of extended portion 2332. Additionally, the upper portion of extended portion 2332 including aperture 2306 may have a higher density than the central area of extended portion 2332. In some embodiments, the material of extended portion 2332 may allow for extended portion 2332 to bend or stretch along the central area to increase comfort for a user. By providing a printable material with a higher density and higher tensile strength around aperture 2306, the structural integrity of extended portion 2332 around aperture 2306 may be increased as compared to other areas of extended portion 2332. Because aperture 2306 may experience higher levels of tensile force than other areas of extended portion 2332, extended portion 2332 may be designed to provide additional strength and support in the area of aperture 2306. In a similar manner, the area of extended portion 2332 adjacent to sole structure 2310 may also experience higher levels of tensile force and, therefore, may also be formed of a printable material with higher tensile strength and rigidity than other areas of extended portion 2332.

Referring now to FIG. 24, two different embodiments of an extended portion are depicted. Extended portion 2432 is an example of an extended portion that may have a similar construction to that of extended portion 2332. As shown, extended portion 2432 is demarcated into five areas that include different ratios of first printable material 1011 and second printable material 1012. Although depicted as distinct areas, the areas may blend into one another as discussed with reference to the composition of upper 2102 as shown in FIG. 22.

In some embodiments, an extended portion may include various portions with various compositions. Extended portion 2432 includes first portion 2420, second portion 2422, third portion 2424, fourth portion 2426, and fifth portion 2428 that are composed of different compositions of first printable material 1011 and second printable material 1012. Each of the indicators depicts an approximate percentage of first printable material 1011 and second printable material 1012 in each of the portions. As shown in FIG. 24, indicator 2440 shows that first portion 2420 has a larger percentage of second printable material 1012 than first printable material 1011. Further, each of the other portions also has an indicator that depicts the relative amount of first printable material 1011 and second printable material 1012. By varying the percentage of the printable material in each of the portions the physical properties of each of the portions may be varied. Indicator 2442 shows that second portion 2422 has a larger percentage of first printable material 1011 than first portion 2420. In this embodiment, second portion 2422 may be more flexible than first portion 2420. First portion 2420 may be more rigid than other portions to provide additional support adjacent to a sole structure and to provide additional support along an area of extended portion 2432 that may experience higher levels of force than other areas of extended portion 2432. Further, indicator 2444 depicts that third portion 2424 has a larger percentage of first printable material than second portion 2422. In this embodiment, third portion 2424 may be more flexible than second portion 2422.

In some embodiments, various portions of an extended portion may have the same or similar compositions. In some embodiments, similar properties may be desired as various areas of an extended portion. As shown in FIG. 24, first portion 2420 may have a similar composition of first printable material 1011 and second printable material 1012 as fifth portion 2428. As shown, indicator 2448 depicts the same or similar composition of first printable material 1011 and second printable material as indicator 2440. Because fifth portion 2428 may experience levels of force and stress similar to first portion 2420, fifth portion 2428 may be composed of materials to counteract the higher levels of force and stress that fifth portion 2428 may experience. Additionally, second portion 2422 and fourth portion 2426 may also have similar compositions to one another. As shown, indicator 2446 depicts the same or similar composition of first printable material 1011 and second printable material as indicator 2442. By providing portions of extended portion 2432 with similar compositions, various areas of extended portion 2432 may have similar properties. For example, first portion 2420 and fifth portion 2428 may have similar properties, and second portion 2422 and fourth portion 2426 may also have similar properties. Third portion 2424 may be more stretchable and flexible than the other portions of extended portion 2432. In the embodiment as shown in FIG. 24, extended portion 2432 may have similar properties on either side of third portion 2424. By positioning portions with similar compositions along extended portion 2432, extended portion may have a uniform feel throughout the length of extended portion 2432. For example, extended portion 2432 may provide strength and rigidity on either side of extended portion 2432.

In some embodiments, an extended portion may have a similar composition along all areas of the extended portion. For example, extended portion 2460 may have a same or similar composition throughout the length of extended portion 2460. As shown, extended portion 2460 may have different widths along the length of extended portion 2460. By varying the width of extended portion 2460 at various areas, the properties of extended portion 2460 may vary. For example, width 2462 at first end 2464 of extended portion 2460 is larger than width 2466 of central portion 2468 of extended portion 2460. In this embodiment, first end 2464 may be less flexible than central portion 2468 of extended portion 2460. Therefore, by varying the quantity of the material in an area of extended portion, the physical properties of the various portions of an extended portion may be varied. In some embodiments, the widths and quantity of material may be used to alter the properties of a portion of extended portion 2460 as opposed to changing the composition of the material used to form extended portion 2460. For example, extended portion 2460 may have similar properties as extended portion 2432 along various portions of extended portion 2460. For example, third portion 2424 of extended portion 2432 may have similar properties to central portion 2468. Additionally, first portion 2420 may have similar properties to first end portion 2470. Second portion 2422 may have similar properties to first intermediate portion 2472. Fourth portion 2426 may have similar properties to second intermediate portion 2474, and fifth portion 2428 may have similar properties to second end portion 2476.

Figure 25:
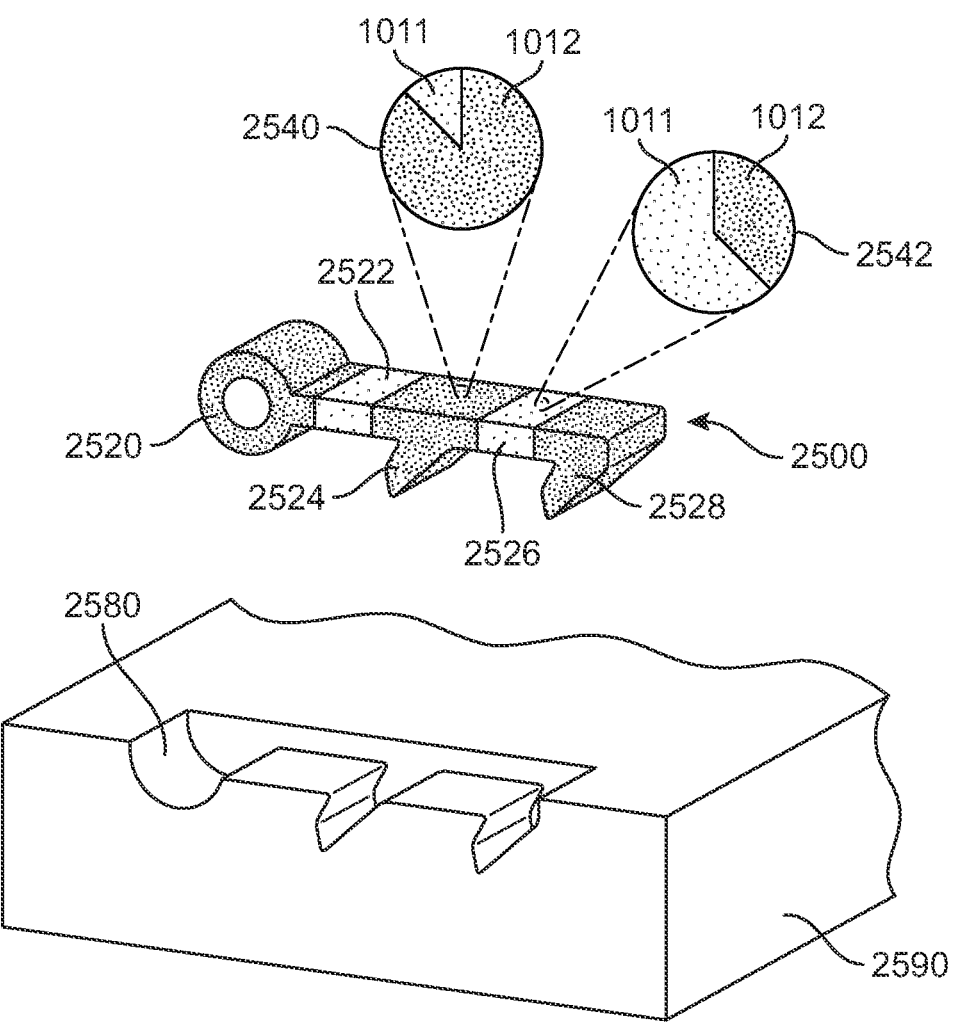
FIG. 25 is a view of an elongated member with printed portions.

In some embodiments, an article may incorporate elongated members as discussed previously in this detailed description. In some embodiments, elongated members may incorporate various compositions of printable material. In some embodiments, an elongated member may include areas that are more flexible than other areas of the elongated member to facilitate easy attachment to a recess in a sole structure. As depicted in FIG. 25, elongated member 2500 includes first portion 2520, second portion 2522, third portion 2524, fourth portion 2526, and fifth portion 2528 along the length of elongated member 2500. Each of the portions may have a different composition of printable material. For example, indicator 2540 depicts the composition of first portion 2520, third portion 2524, and fifth portion 2528. As shown, first portion 2520, third portion 2524, and fifth portion 2528 all have a larger percentage of second printable material 1012 than first printable material 1011. These portions of elongated member 2500 may be more rigid than second portion 2522 and fourth portion 2526 and may be used to engage firmly with a portion of sole structure 2590.

In some embodiments, portions of elongated member 2500 may be configured to provide greater flexibility than other portions of elongated member 2500. As shown in FIG. 25, second portion 2522 and fourth portion 2526 may be configured to be more flexible than other portions of elongated member 2500. Second portion 2522 and fourth portion 2526 may be configured as connecting portions between the other portions of elongated member 2500. Indicator 2542 depicts the composition of second portion 2522 and fourth portion 2526 that includes a greater percentage of first printable material 1011 than second printable material 1012. By providing elongated member 2500 with portions that are more flexible than others, elongated member 2500 may be more likely to bend or flex along second portion 2522 and fourth portion 2526. This flexibility may be useful when positioning elongated member 2500 within recess 2580 of portion of sole structure 2590.

Figure 26:
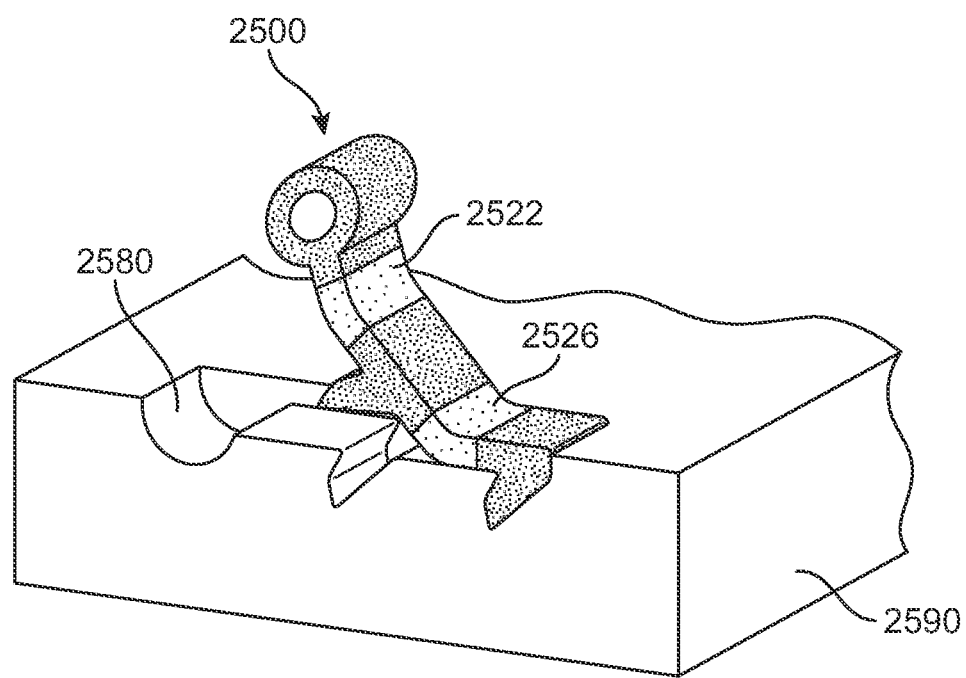
FIG. 26 is a view of an elongated member being inserted into a recess of a portion of a sole structure.

Referring to FIG. 26, elongated member 2500 is shown being placed into recess 2580 of portion of sole structure 2590. As shown, elongated member 2500 bends along second portion 2522 and fourth portion 2526. By configuring elongated member 2500 to include areas of flexibility, elongated member 2500 may be bent as elongated member 2500 is inserted into recess 2580 and, therefore, may allow a user to position each portion of elongated member 2500 into recess 2580 with greater ease than in an embodiment in which elongated member 2500 has a uniform composition.

While various embodiments have been described, the description is intended to be exemplary, rather than limiting, and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:
1. An article of footwear, comprising:
an upper having a lower peripheral portion, wherein the upper includes an elongated member extending from the lower peripheral portion;
the upper being formed of a first printable material and a second printable material, the first printable material having a higher flexibility than the second printable material;
a sole structure having a top surface and an opposing bottom surface, wherein the top surface is disposed closer to the upper than is the bottom surface;
a perimeter portion of the upper having a first composition including more of the second printable material than the first printable material, wherein the perimeter portion is located adjacent to the sole structure;
a second portion of the upper having a second composition that has more of the first printable material than the first composition, wherein the second portion of the upper is spaced from the sole structure;
the sole structure including a recess disposed in the top surface;
the top surface of the sole structure further including an interior portion, and also including an outer peripheral portion disposed outwardly of the interior portion;
wherein the recess includes a first end portion associated with the outer peripheral portion of the top surface and wherein the recess includes a second end portion associated with the interior portion of the top surface;

wherein the elongated member includes a first end portion and wherein the elongated member includes a second end portion; and wherein the first end portion of the elongated member engages the first end portion of the recess and wherein the second end portion of the elongated member engages the second end portion of the recess.

2. The article of footwear according to claim 1, wherein the upper includes an instep area, wherein the instep area is composed of a material including a larger percentage of the second printable material than the first printable material.

3. The article of footwear according to claim 1, wherein the upper includes a heel counter that is formed of a material that includes a larger percentage of the second printable material than the first printable material.

4. The article of footwear according to claim 1, wherein the upper includes a toe cap that is formed of a material that includes a larger percentage of the second printable material than the first printable material.

5. The article of footwear according to claim 1, wherein the upper includes a third portion that is formed of a material that includes a larger percentage of the first printable material than the second printable material.

6. The article of footwear according to claim 1, wherein the upper includes a cord element coupled with and extending along the lower peripheral portion of the upper, and wherein the elongated member is attached to the cord element.

7. The article of footwear according to claim 1, wherein the elongated member includes a first connecting portion between the first end portion and the second end portion, the first connecting portion being composed of a material having a higher percentage of the first printable material than the material used to form the first end portion.

8. The article of footwear according to claim 7, wherein the elongated member is configured to bend along the first connecting portion when being inserted into the recess of the sole structure.

9. An article of footwear, comprising:

an upper having a lower peripheral portion, wherein the upper includes an elongated member extending from the lower peripheral portion;

a sole structure having a top surface and an opposing bottom surface, wherein the top surface is disposed closer to the upper than is the bottom surface;

the sole structure including a recess disposed in the top surface;

the top surface of the sole structure further including an interior portion, and also including an outer peripheral portion disposed outwardly of the interior portion;

wherein the elongated member is formed of a first printable material and a second printable material, the first printable material being more flexible than the second printable material;

wherein the recess includes a first end portion associated with the outer peripheral portion of the top surface and wherein the recess includes a second end portion associated with the interior portion of the top surface;

wherein the elongated member includes a first end portion and wherein the elongated member includes a second end portion; and wherein the first end portion of the elongated member engages the first end portion of the recess and wherein the second end portion of the elongated member engages the second end portion of the recess; and wherein a first connecting portion is located between the first end portion of the elongated member and the second end portion of the elongated member, the first connecting portion being formed of a material that has more of the first printable material than the material used to form one of the first end portion of the elongated member and the second end portion of the elongated member.

10. The article of footwear according to claim 9, wherein the elongated member is configured to bend along the first connecting portion when being inserted into the recess of the sole structure.

11. The article of footwear according to claim 9, wherein the upper is formed of the first printable material and the second printable material.

12. The article of footwear according to claim 11, further comprising:

a perimeter portion of the upper having a first composition including a larger percentage of the second printable material than the first printable material; and a second portion of the upper having a second composition that has a larger percentage of the first printable material than the percentage of the first printable material in the first composition, wherein the second portion of the upper is spaced from the sole structure;

wherein the perimeter portion is located adjacent to the sole structure.

13. The article of footwear according to claim 12, wherein the elongated member further comprises a central portion, the central portion being disposed between the first end portion of the elongated member and the second end portion of the elongated member.

14. The article of footwear according to claim 13, wherein the first connecting portion connects the first end portion of the elongated member and the central portion, and wherein a second connecting portion connects the central portion to the second end portion of the elongated member;

wherein the second connecting portion is formed of a material that has a higher percentage of the first printable material than the material used to form one of the first end portion of the elongated member and the second end portion of the elongated member.

15. The article of footwear according to claim 9, wherein the second end portion of the elongated member includes a first protrusion;

wherein the second end portion of the recess includes a first notch;

wherein the first protrusion engages the first notch.

16. An article of footwear, comprising:

an upper having a perimeter portion and a second portion, the perimeter portion and the second portion formed entirely of printable materials including a first printable material and a second printable material, the first printable material having a higher flexibility than the second printable material;

a sole structure attached to the upper;

the perimeter portion of the upper having a first composition;

the first composition including a larger percentage of the second printable material than the first printable material, wherein the perimeter portion is located adjacent to the sole structure;

the second portion of the upper having a second composition;

the second composition including a larger percentage of the first printable material than the percentage of the first printable material in the first composition, wherein the second portion of the upper is spaced from the sole structure;
wherein the perimeter portion of the upper is configured to resist stretching.

17. The article of footwear according to claim 16, wherein the upper includes an instep area, wherein the instep area is composed of a material including a larger percentage of the second printable material than the first printable material.

18. The article of footwear according to claim 17, wherein the second portion is located between the instep area and the perimeter portion.

19. The article according to claim 16, wherein the upper has a lower peripheral portion, wherein the upper includes an elongated member extending from the lower peripheral portion;
wherein the sole structure has a top surface and an opposing bottom surface, the top surface being disposed closer to the upper than is the bottom surface;
the sole structure including a recess disposed in the top surface;
the top surface of the sole structure further including an interior portion, and also including an outer peripheral portion disposed outwardly of the interior portion;
wherein the elongated member is formed of the first printable material and the second printable material;
wherein the recess includes a first end portion associated with the outer peripheral portion of the top surface and wherein the recess includes a second end portion associated with the interior portion of the top surface;
wherein the elongated member includes a first end portion and wherein the elongated member includes a second end portion; and
wherein the first end portion of the elongated member engages the first end portion of the recess and wherein the second end portion of the elongated member engages the second end portion of the recess.

20. The article according to claim 19, wherein a first connecting portion is located between the first end portion of the elongated member and the second end portion of the elongated member, the first connecting portion being formed of a material that has a higher percentage of the first printable material than the material used to form one of the first end portion of the elongated member and the second end portion of the elongated member.

* * * * *